United States Patent
Miyahara et al.

(10) Patent No.: US 6,341,350 B1
(45) Date of Patent: Jan. 22, 2002

(54) DEVICE AND METHOD FOR PROCESSING IMAGE DATA, TRANSMITTING MEDIUM, AND RECORDING MEDIUM

(75) Inventors: Nobuyoshi Miyahara, Kanagawa; Yoichi Yagasaki, Tokyo, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/144,855

(22) Filed: Sep. 1, 1998

(30) Foreign Application Priority Data

Sep. 2, 1997 (JP) .............................................. 9-252819

(51) Int. Cl.$^7$ .............................................. G06F 01/24
(52) U.S. Cl. ........................ 713/176; 713/178; 713/179
(58) Field of Search ................. 713/176, 178, 713/179

(56) References Cited

U.S. PATENT DOCUMENTS

| | | | | |
|---|---|---|---|---|
| 5,488,664 A | * | 1/1996 | Shamir ........................ | 380/54 |
| 5,721,788 A | * | 2/1998 | Powell et al. ................ | 382/100 |
| 5,748,783 A | * | 5/1998 | Rhoads ........................ | 382/232 |
| 5,862,218 A | * | 1/1999 | Steinberg ..................... | 713/176 |
| 5,875,249 A | * | 2/1999 | Mintzer et al. ................ | 380/54 |
| 6,101,602 A | * | 8/2000 | Fridrich ....................... | 713/176 |
| 6,104,812 A | * | 8/2000 | Koltai et al. .................. | 380/51 |
| 6,182,218 B1 | * | 1/2001 | Saito ........................... | 713/176 |

* cited by examiner

*Primary Examiner*—Thomas R. Peeso
(74) *Attorney, Agent, or Firm*—Frommer Lawrence & Haug LLP; William S. Frommer; Darren M. Simon

(57) ABSTRACT

A device and method for processing image data, a transmitting medium, and a recording medium are disclosed. More particularly, in image data processing by which accompanying information is embedded as a watermark into coded image data, a position in a block as a unit of coding the coded image data is detected, a blocked watermark pattern is provided, an area in which an operation relative to a first level value is performed and an area in which an operation relative to a second level value is performed are offered, and a watermark is appended to the coded image data in accordance with the blocked watermark pattern. It is thus possible to easily append a watermark that can be certainly detected.

22 Claims, 32 Drawing Sheets

FIG. 9
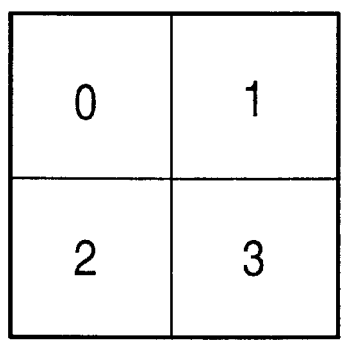
Y
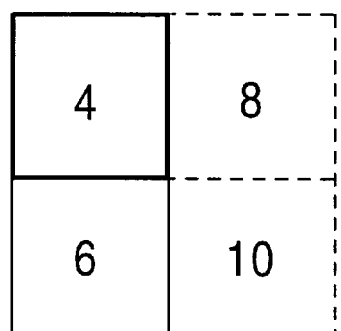
Cb
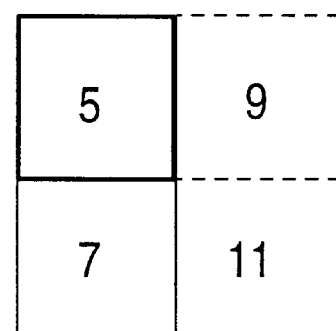
Cr
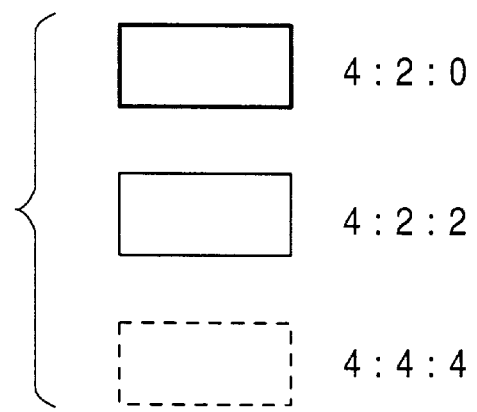

FIG. 17A

| VLC | DC ELEMENT SIZE FOR LUMINANCE |
|---|---|
| 100 | 0 |
| 00 | 1 |
| 01 | 2 |
| 101 | 3 |
| 110 | 4 |
| 1110 | 5 |
| 11110 | 6 |
| 111110 | 7 |
| 1111110 | 8 |

FIG. 17B

| VLC | DC ELEMENT SIZE FOR DIFFERENCE |
|---|---|
| 00 | 0 |
| 01 | 1 |
| 10 | 2 |
| 110 | 3 |
| 1110 | 4 |
| 11110 | 5 |
| 111110 | 6 |
| 1111110 | 7 |
| 11111110 | 8 |

FIG. 18

| EXAMPLE WHEN SIZE OF DCT DC COMPONENT = 3 ||
|---|---|
| DCT DC Differential | DCT zz (0) |
| 000 | −7 |
| 001 | −6 |
| 010 | −5 |
| 011 | −4 |
| 100 | 4 |
| 101 | 5 |
| 110 | 6 |
| 111 | 7 |

FIG. 19

| Variable length code | motion_code[r][s][t] |
|---|---|
| 0000 0011 001 | −16 |
| 0000 0011 011 | −15 |
| 0000 0011 101 | −14 |
| 0000 0011 111 | −13 |
| 0000 0100 001 | −12 |
| 0000 0100 011 | −11 |
| 0000 0100 11 | −10 |
| 0000 0101 01 | −9 |
| 0000 0101 11 | −8 |
| 0000 0111 | −7 |
| 0000 1001 | −6 |
| 0000 1011 | −5 |
| 0000 111 | −4 |
| 0001 1 | −3 |
| 0011 | −2 |
| 011 | −1 |
| 1 | 0 |
| 010 | 1 |
| 0010 | 2 |
| 0001 0 | 3 |
| 0000 110 | 4 |
| 0000 1010 | 5 |
| 0000 1000 | 6 |
| 0000 0110 | 7 |
| 0000 0101 10 | 8 |
| 0000 0101 00 | 9 |
| 0000 0100 10 | 10 |
| 0000 0100 010 | 11 |
| 0000 0100 000 | 12 |
| 0000 0011 110 | 13 |
| 0000 0011 100 | 14 |
| 0000 0011 010 | 15 |
| 0000 0011 000 | 16 |

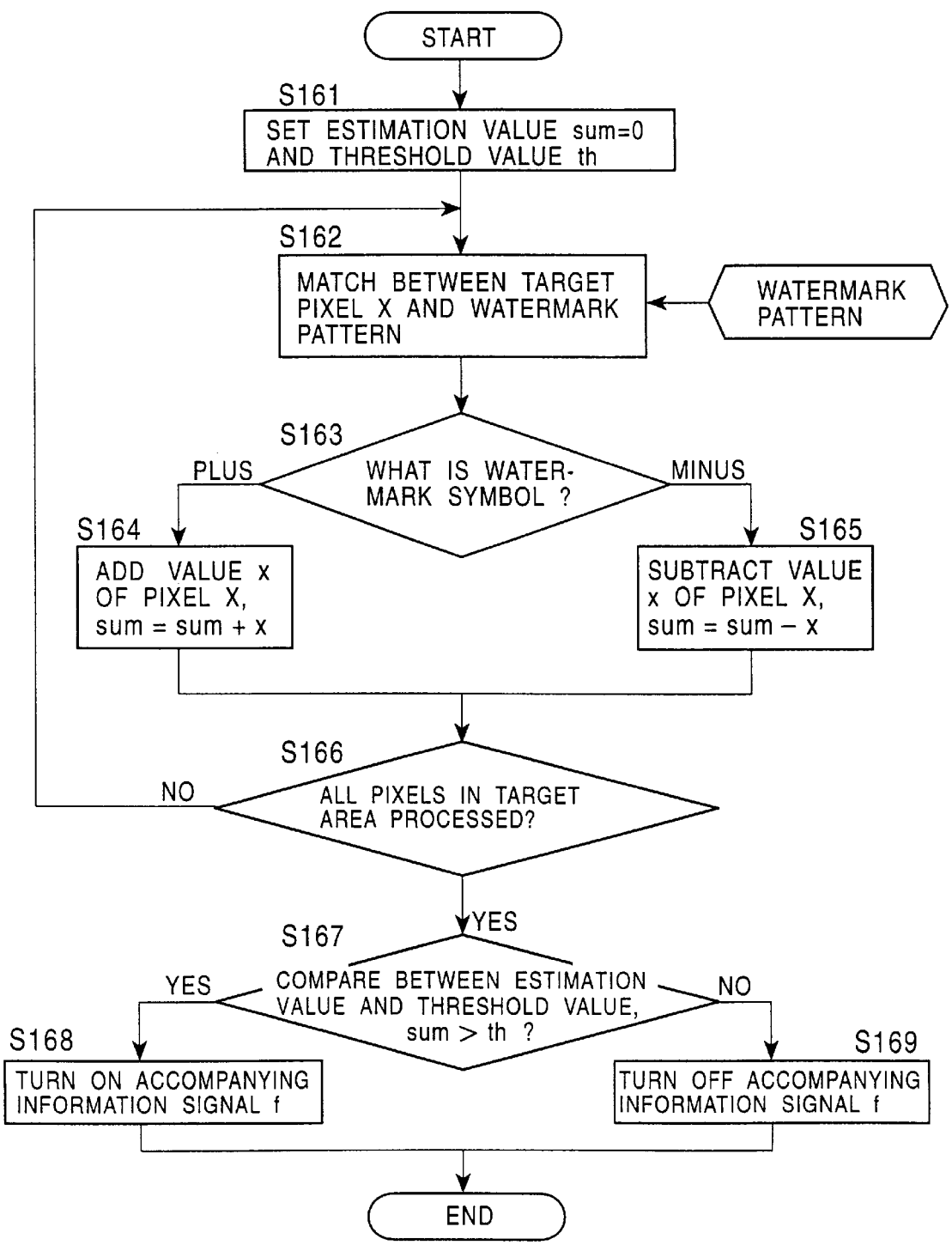

DEVICE AND METHOD FOR PROCESSING IMAGE DATA, TRANSMITTING MEDIUM, AND RECORDING MEDIUM

BACKGROUND OF THE INVENTION

1. Field of the Invention

The present invention relates to a device and method for processing image data, a transmitting medium, and a recording medium. More particularly, the present invention relates to a device and method for processing image data, a transmitting medium, and a recording medium, in which a watermark is blocked, thereby the watermark can be certainly appended to coded image data and can be detected.

2. Description of the Related Art

There is existing a technology of appending some accompanying information associated with the image data into a particular image data (of a static image or a time-varying image sequence) and detecting the accompanying information when reproducing. A representative example thereof is appendage of information regarding the copyright.

In the case where there is a possibility that unspecified users can use particular image data, it is necessary to append information regarding the copyright of the image into the image data in order that a copyright holder of the image asserts his copyright. By appending copyright information in advance, it becomes possible to take measures such as disabling display of the image data when copyright information indicative of inhibiting display of the image data is detected during processing in an image reproducing apparatus or a data reproducing method.

The aforementioned appendage and detection of copyright information is currently much used for preventing the unauthorized copying of videotapes and the like. Recently, there are many video-rental shops lending videotapes. If many of users make an unauthorized duplication of the videotape lent from a video-rental shop at a low price and enjoy the duplicated recordings, economical damages of the copyright holders of the videotape and the video rental shops are significant.

Since image data is recorded on videotape in an analogue fashion, the quality of the copied image is more or less degraded. Accordingly, if such copying is repeated a plurality of times, maintaining the same image quality as the first copy is very difficult.

On the other hand, in a reproducing apparatus and the like which records and reproduces image data in a digital fashion, economical damages produced by the unauthorized copying becomes more serious. This is because that the image quality is not degraded fundamentally by copying in a device or the like that manipulates image data in a digital fashion. Therefore, prevention of the unauthorized duplication in a device or the like that employs digital fashion processing is much more important compared with an apparatus or the like performing the analogue fashion processing.

Mainly, there are two methods for appending accompanying information associated with image data into the image data.

In accordance with the first method, the accompanying information is appended to an auxiliary part of the image data. In videotape, for example, the auxiliary information of the image data is recorded at the top (auxiliary part) of the picture that is substantially invisible when viewed. It is possible to append the accompanying information by using a part of this area.

In accordance with the second method, the accompanying information is appended to a main part (substantially visible part) of the image data. This is done by appending a particular pattern (watermark pattern) to the whole or a part of the image to an invisible extent. An example thereof is spread spectrum communication in which information is appended or detected using a key pattern generated through the use of random numbers, a maximum length sequence, etc.

Hereinafter, a description will be made of one example of appendage of the accompanying information to a main part of image data or detection thereof when a watermark pattern is used. FIG. 26 to FIG. 29 show one embodiment thereof.

Here, it is assumed that a watermark pattern corresponding to 4n×4n pixels as shown in FIG. 26 is used. Each pixel of the watermark pattern takes on a plus or minus symbol. It is desirable that the pixels take on either one of these two symbols at random, and the shape and size of the area may be optional.

For appending a watermark, an area having the same size as the watermark pattern area is selected from the image to be subjected to the appendage. The selected area is superimposed over the watermark pattern and compared therewith. Value "a" is added to each of pixels corresponding to the plus symbol, and value "b" is subtracted from each of pixels corresponding to the minus symbol. Both values "a" and "b" may be optional, but each of the values should be constant through the watermark pattern.

In the example shown in FIG. 27 to FIG. 29, it is assumed that a=1 and b=1. When values of the pixels to be subjected to the appendage are all 100 as shown in FIG. 27, pixel values of 101 and 99 are generated by an embedding operation corresponding to the watermark.

For detecting a watermark, an area having the same size as the watermark pattern is area having the same size as the watermark pattern area is selected from the image that is to be subjected to the appendage. The value obtained by adding all the pixel values in this area is used as an evaluation value. For adding all the pixel values, the selected area is superimposed over and compared with the watermark pattern. Then each of the pixels corresponding to the plus symbol is subjected to addition and each of the pixels corresponding to the minus symbol is subjected to subtraction. In the example shown in FIG. 28, the pixels having a pixel value of 101 are subjected to addition while the pixels having a pixel value of 99 are subjected to subtraction, and all the results thereof are added. At this time, unless the same watermark pattern as that of used for appending the watermark is used, the watermark can not be detected properly. According to the aforementioned detection operation, the evaluation value when the watermark is appended becomes $(4n)^2$ (that is equal to the number of the pixels contained in the area) as shown in FIG. 28, and the evaluation value when the watermark is not appended becomes 0 as shown in FIG. 29.

When the area of the watermark pattern is large enough and the watermark pattern is arranged in a sufficiently random fashion, the evaluation value when no watermark is appended always becomes about 0. Therefore, when the evaluation value exceeds a particular threshold value, it is determined that any watermark is appended. According to the procedure mentioned above, it becomes possible to append binary data (1 bit) indicating whether or not the watermark is appended. When much more information is desired to be appended, the entire image is divided into k areas and each of the areas is subjected to proper processing such as performing the foregoing operations, thereby $2^k$ (k bit) piece of information can be appended.

For example, a watermark pattern generated through M-sequences may be used. The M-sequence (maximum length sequence) is a number sequence consisting of binary symbols of 0 or 1. The statistical distribution of 0's and 1's are homogeneous. A correlation code at zero point is 1, and the others are inversely proportional to a code length. It is of course that the watermark pattern may be used through the use of other method than that of using the M-sequence.

When recording and reproducing image data in a digital fashion, the image data is generally compressed since the information volume thereof becomes considerably abundant as it is. High-efficiency coding methods such as JPEG (Joint Photographic Experts Group) (color still-picture coding method), MPEG (Moving Picture experts Group) (color moving-picture coding method) and the like are standardized internationally as the image data compressing methods and put to practical use. Next, a description will be made of a configuration example of appending and detecting the accompanying information, taking the case of compressing image data in accordance with this high-efficiency coding.

FIG. 30 shows a configuration of an encoder. An accompanying information signal f is looked up when given image data is supplied to a watermarking device 1. Whether the processing to append the watermark is performed is determined depending on the obtained accompanying information signal f. Then the image data is supplied to a coder 2 where high-efficient coding is carried out for generating the corresponding code bit string.

FIG. 31 shows a more specific configuration example of the coder 2. In this example, the coder 2 comprises a frame memory 41 that is adapted to storing the image data supplied from the watermarking device 1 frame by frame. A motion vector detector 50 detects a motion vector v from the image data stored in the frame memory, and supplies the results both to a motion compensator and a variable length coding device 46. In the motion vector detector 50, a block matching operation is carried out in macro blocks. Each macro block consists of 16×16 pixels. Then the motion vector v is detected. In order to increase accuracy, a matching operation in half-pixels is also carried out.

The motion compensation device 43 incorporates therein a frame memory. Using the image which was once coded, then encoded, and stored in the incorporated frame memory, the motion compensation device predicts pixel values at respective positions in the current frame to be coded. A predicted value I' $\{i, j, t\}$ of a pixel value I $\{i, j, t\}$ at a frame position (i, j) which is supplied at the time "t" is determined using the motion vector v=(vx (i, j, t), vy (i, j, t)) by the following equation:

$$I'\{i, j, t\}=(I\{i', j', t-T\}+I\{i'+1, j', t-T\}+I\{i', j'+1, t-T\}+I\{i', j'+1, t-T\})/4.$$

Here, i' and j' are given by the following equations:

$$i'=int(i+vx(i, j, t)T),$$

$$j'=int(j+vy(i, j, t)T),$$

where T is a difference between the time when an image I to be currently predicted is supplied and the time when an image memory already stored in the frame memory is supplied. The right side of the above expression I$\{$i', j', t-T$\}$+I$\{$i'+1, j', t-T$\}$+I$\{$i', j'+1, t-T$\}$+I$\{$i', j'+1, t-T$\}$ represents the pixel values stored in the frame memory which is stored in the motion compensator 43, and int(x) represents the maximum integer not greater than x.

A subtracter 42 subtracts the predicted value obtained by performing motion compensation in accordance with the motion vector v which is supplied from the motion compensator 43 from the image value to be currently coded which is supplied from the frame memory 41. A DCT device 44 subjects an 8×8 pixel block consisting of difference values supplied from the subtracter 42 to two-dimensional DCT (Discrete Cosine Transform). A quantizer 45 uses an appropriate step size Q for quantizing DCT coefficient c supplied from the DCT device 44 following the next equation:

$$c'=int(c/Q).$$

The DCT coefficient c' obtained through the quantization by the quantizer 45 is supplied to both a variable length coding device 46 and an inverse quantizer 47. The variable length coding device 46 subjects both the DCT coefficient c' which is quantized by the quantizer 45 and the motion vector v supplied from a motion vector detector 40 to variable length coding, and feeds a resultant code bit string.

The inverse quantizer 47 makes inverse quantization processing as is given by the following equation using the step size Q that is same as the step size used by the quantizer 45:

$$c''=c'xQ$$

The data obtained by the inverse quantization by the inverse quantizer 47 is supplied to an IDCT device 47 in which the data is subjected to inverse DCT processing and the pixel difference value is restored.

The difference value supplied from the IDCT device 48 is added by an adder 49 to the predicted value supplied from the motion compensator 48 and restored to its original pixel value data. The resultant data is then stored in the frame memory incorporated in the motion compensator 43.

Generally, inter-picture coding (INTER coding) is carried out for coding the difference from the predicted value as mentioned above. However, when the difference between the pixel value to be currently coded and the predicted value calculated by the motion compensator 43 is large, intra-picture coding (INTRA coding) may be carried out for prevention of increase of the code bit amount. That is, each pixel value in the block is supplied to the DCT device 44 without performing a difference calculation, where the pixel value is subjected to coding.

FIG. 32 shows a decoder. A supplied code bit string is restored to the image data in a decoder 21. Then, a watermark detector 22 detects an accompanying information signal f.

FIG. 33 shows a detailed configuration example of the decoder 21. In this configuration example, a variable length decoding device 61 of the decoder 21 subjects the supplied code bit string to variable length decoding processing, then supplies the resultant restored image data (DCT coefficient) to an inverse quantizer 62, and transmits the motion of the decoded motion vector v to a motion compensator 65. The inverse quantizer 62 subjects the supplied DCT coefficient to inverse quantization, and sends the result to IDCT device-63. The IDCT device 63 subjects the inverse-quantized DCT coefficient to IDCT processing, thereby restores the image data having the original differential value, and then supplies the result to an adder 64.

The motion compensator 65 subjects the image data stored in the incorporated frame memory to motion compensation in accordance with the motion vector v supplied from the variable length coding device 61, and generates and supplies a predicted image to the adder 64. Then the adder 64 adds to the predicted image the differential value received from the IDCT device 63, and thereby restores and supplies the original frame image.

The output data from the adder 64 is supplied and stored in a frame memory incorporated in the motion compensator 65, and also supplied to the water mark detector 22. The watermark detector 22 detects and transmits the accompanying information signal f from the received image data and supplies the original image data.

If the image data is not subjected to high-efficiency coding, it is appropriate to use the configurations identical with those of FIG. 30 and FIG. 32 except that the coder 2 and decoder 21 are omitted respectively.

Configurations of a watermarking device 1 and a watermark detector 22 are illustrated in FIG. 34 and FIG. 36, respectively.

FIG. 34 shows a configuration of the watermarking device 1. Supplied image data and an accompanying information signal f to be referred to are both transmitted to a watermark image generator 11. If the accompany information signal f is on, then a watermark is appended to each of pixels in a target image area. For this purpose, first, the watermark image generator 11 transmits to a matching controller 101 a position p of a target pixel to be appended. For example, this pixel position p may be represented in one-dimensional expression by indicating the ordinal number of pixel position when counting from an upper left position of the image in a scanning order. The watermark pattern matching controller 101 looks up a symbol of the watermark pattern stored in a watermark pattern holding memory 12 based on the pixel position p, and passes the obtained symbol S to the watermark image generator 11. The watermark image generator 11 uses the supplied symbol S to append the watermark to a target pixel.

FIG. 36 shows a series of processing carried out in the watermarking device 1. First, in step S141, watermarking levels a and b are set to predetermined values. In step S142, an area having the same size as the watermark pattern area is selected from a target image, and each pixel in the selected area is matched against the watermark pattern. In step S143, a symbol of the watermark is discriminated, and if the symbol of the watermark pattern corresponding to the pixel is plus, then the value a is added to the pixel in step S144. On the other hand, if the symbol of the water pattern corresponding to the pixel is minus, then the value b is subtracted from the pixel in step S145. The foregoing processing is repeated until step S146 determines that all the pixels in the target area have been processed.

FIG. 35 shows a configuration of the watermark detector 22. Supplied image data is given to an estimation value calculator 31. In order to obtain an estimation value from each pixel on the target image area, the estimation value calculator 31 transmits an image position p to be estimated to the watermark pattern-matching controller 111. As mentioned above, this image position p is represented in one-dimensional expression by indicating the ordinal number of pixel position when counting from an upper left position of the image in a scanning order. The watermark pattern matching controller 111 looks up a symbol of the watermark pattern stored in the watermark pattern holding memory 32 based on the pixel position p, and passes the obtained symbol S to the watermark image generator 31. The watermark image generator 31 uses the supplied symbol S to calculate the estimation value. The resultant estimation value is subjected to thresholding in an estimation value comparator 33, and the accompanying information signal f is supplied. Besides, the supplied image data is outputted through an image converter 34 as it is or after subjected to predetermined handling or processing.

FIG. 37 shows a series of processing carried out in the watermark detector 22. First, in step S161, an estimation value sum is initialized and a threshold value "th" is set. In step S162, an area equal to a watermark pattern area in size is selected, and then each element in the selected area is matched against the watermark pattern. If step S163 determines that the symbol of the watermark corresponding to the pixel is plus, then the pixel value is added to the evaluation value sum in step S164. On the other hand, if the symbol of the water pattern corresponding to the pixel is minus, then the pixel value is subtracted from the evaluation value sum in step S165. The foregoing processing is repeated until step S166 determines that all the pixels in the target area have been processed. After that, the evaluation value sum is compared with the threshold value "th" in step S167. If the result is sum>th, then it is determined that the watermark is appended, and an accompanying information signal f is turned on in step S168. If not, then the accompanying information signal f is turned off in step S169.

The accompanying information signal f is used for prevention of the unauthorized copying as follows. Taking the decoder in FIG. 32 as an example, image data and an accompanying information signal f to be transmitted are passed to an image display section not shown. The image display section displays the image as it is if the accompanying information signal f is on. However, if the accompanying information signal f is off, then the display section carries out various handling or processing such as not displaying images, not displaying main area of the image data, scrambling the image (displaying received image data at random), and so on. Alternatively, an image converter 34 disposed in the watermark detector 22 as shown in FIG. 35 may be provided for carrying out the foregoing image data handling or processing depending on the accompanying information signal f.

The aforementioned two methods for appending information associated with image data into the image data come with problems mentioned below.

In the first method for appending an accompanying information to an auxiliary part of image data, if the auxiliary part to which the accompanying information is appended is ignored, then it becomes different to prevent unauthorized copying. For example, if one allows a commercially available personal computer to read therein image data that is recorded in a digital fashion, ignores the auxiliary part of the image and extracts only the main part thereof, the image quality becomes precisely identical with that before copying. In this case, appending the accompanying information to the auxiliary part becomes useless.

In the second method, appended accompanying information does not become lost, for example, by the copying procedure as mentioned in connection with the foregoing first method. However, when image data is subjected to various signal processing such as noise reduction filtering or the like, the components of the appended accompanying information can be attenuated and become impossible to be extracted.

Particularly, in the case that original image data itself is compressed in accordance with high-efficiency coding such as JPEG, MPEG, or the like, an adverse affect caused by quantization processing may be exerted. Owing to quantization of the high-efficiency coding, components of the appended accompanying information are amplified to an extent to be visible, thereby the image quality becomes degraded, or attenuated to the extent that they can not be extracted, and its original meaning can be lost.

There is another method to add the accompanying information using a special area on the image so that the components of the accompanying information are not changed by the aforementioned signal processing. From the viewpoint of a whole image sequence, however, such area is provided at only one part thereof, and therefore it is impossible to reserve a sufficient large area for a watermark pattern. For this reason, the evaluation value takes on a large value other than zero even when no accompanying information is added. As a result, when an absolute evaluation criteria is used to judge that some accompanying information is appended if a predetermined threshold value is exceeded, detection of the accompanying information becomes very difficult.

In addition, when the area to which the accompanying information is appended is only one part from a viewpoint of whole image sequence, it becomes considerably difficult to append plural pieces of information. For example, when the whole image is divided into k areas and then the accompanying information is appended to each of these areas, a watermark pattern area for each of these areas becomes smaller depending on the number of these areas, and therefore detection of the accompanying information becomes substantially impossible.

These problems mentioned above are particularly remarkable in time-varying image sequence.

SUMMARY OF THE INVENTION

With the above problems in view, an object of the present invention is to enable accompanying information to be detected certainly without exerting a significant influence to original image data.

A device and method for processing image data, and a transmitting medium of the present invention described here are characterized in that, in image data processing by which accompanying information is embedded as a watermark into coded image data, a position of the coded image data in a block as a coding unit is detected, a blocked watermark pattern is provided, an area in which an operation relative to a first level value is performed and an area in which an operation relative to a second level value is performed are offered, and a watermark is appended to the coded image data in accordance with the blocked watermark pattern.

Further, a device and method for processing image data, and a transmitting medium of the present invention are characterized in that, in image data processing by which image data having accompanying information embedded as a watermark is processed, a position of the coded image data in a block as a coding unit is detected, a blocked watermark pattern is generated, an area in which an operation relative to a first level value is performed and an area in which an operation relative to a second level value is performed are offered, an evaluation value of the coded image is calculated in accordance with the blocked watermark pattern, and the evaluation value is compared with a predetermined reference value.

BRIEF DESCRIPTION OF THE DRAWINGS

FIG. 9 is a diagram for illustrating a structure of a macro block;

FIG. 17 is a diagram for illustrating size of DCT coefficient;

FIG. 18 is a diagram for illustrating a differential method for DCT coefficient;

FIG. 19 is a diagram for illustrating a variable length code;

FIG. 37 is a flowchart for illustrating an operation of the watermark detector 22 in FIG. 35.

DESCRIPTION OF THE PREFERRED EMBODIMENTS

Figure 1:
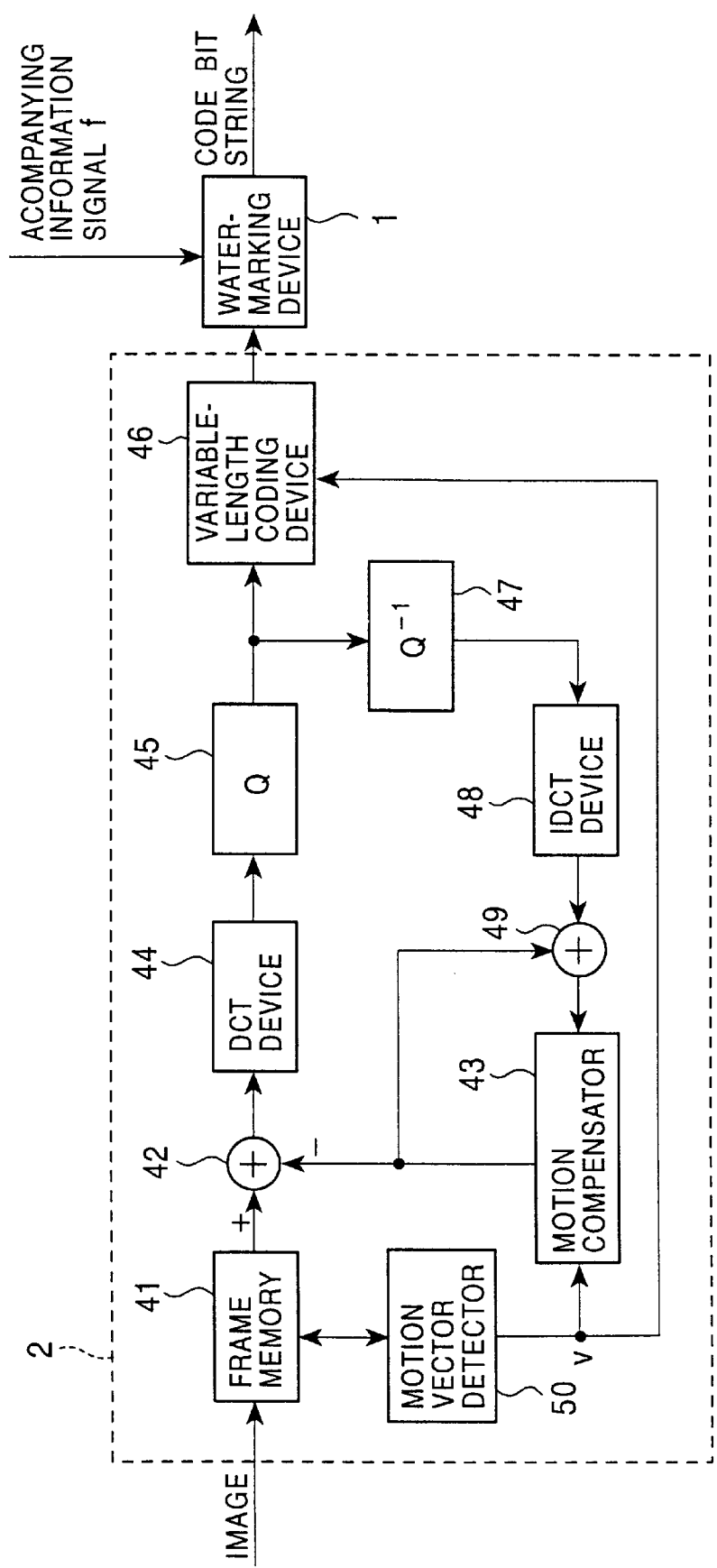
FIG. 1 is a block diagram showing a configuration example of an encoder to which the present invention applied.
Figure 30:
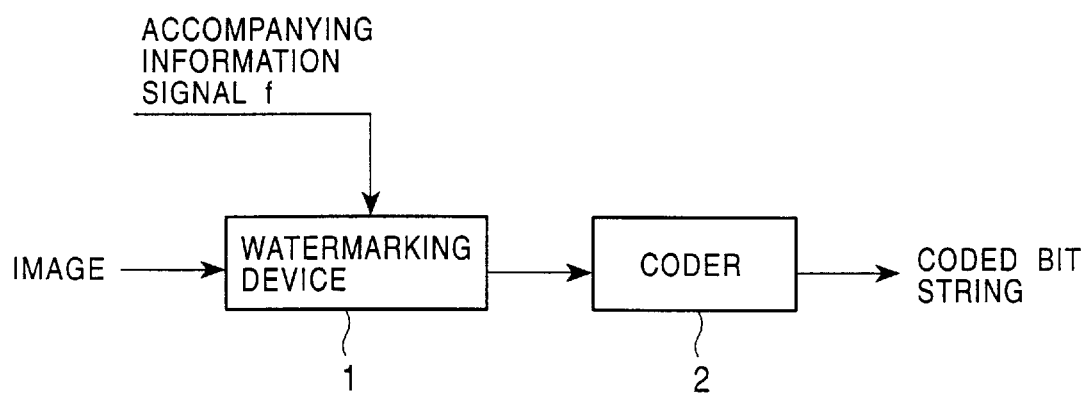
FIG. 30 is a block diagram showing a configuration example of a conventional encoder.
Figure 31:
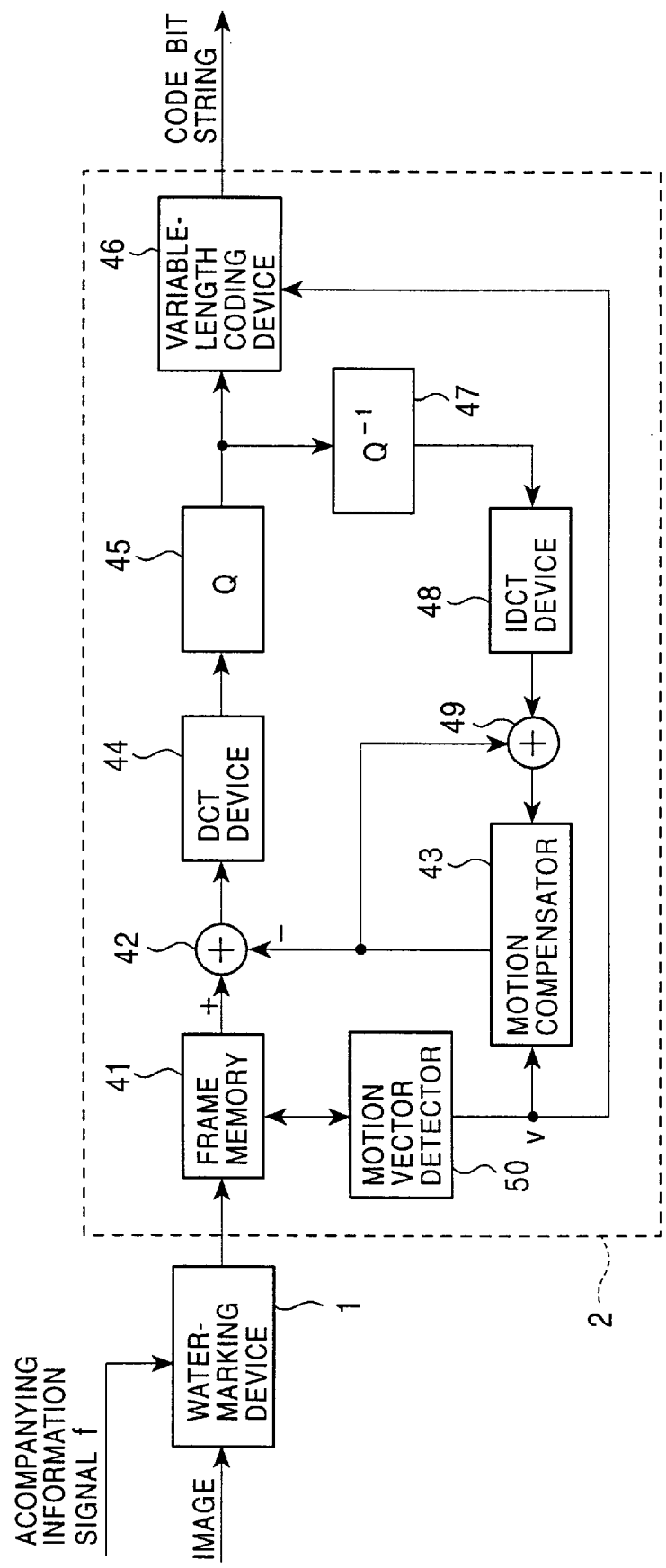
FIG. 31 is a block diagram showing a configuration example of a coder 2 of a conventional encoder.

FIG. 1 shows a configuration example of an encoder to which the present invention is applied, in which similar parts to those of conventional encoders shown in FIG. 30 and FIG. 31 are designated by similar reference numerals. In this configuration example, in contrast to those shown in FIG. 30 and FIG. 31, image data is first supplied to a coder 2 in which the data is coded, and then fed to a watermarking device 1 in which a watermark is appended thereto. The configuration and operation of the coder 2 are similar to those of the coder 2 shown in FIG. 31.

Figure 2:
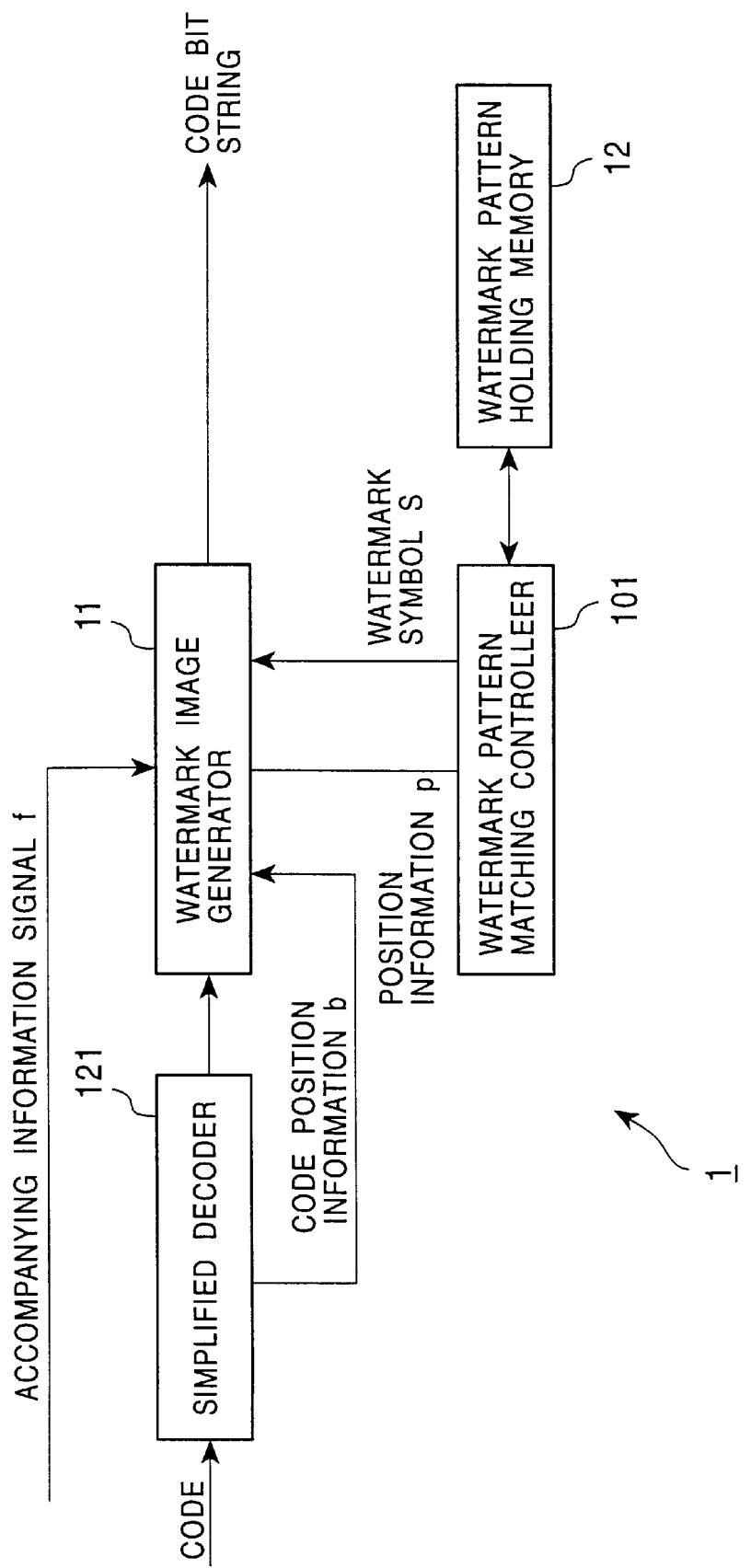
FIG. 2 is a block diagram showing a configuration example of the watermarking device 1 in FIG. 1.
Figure 34:
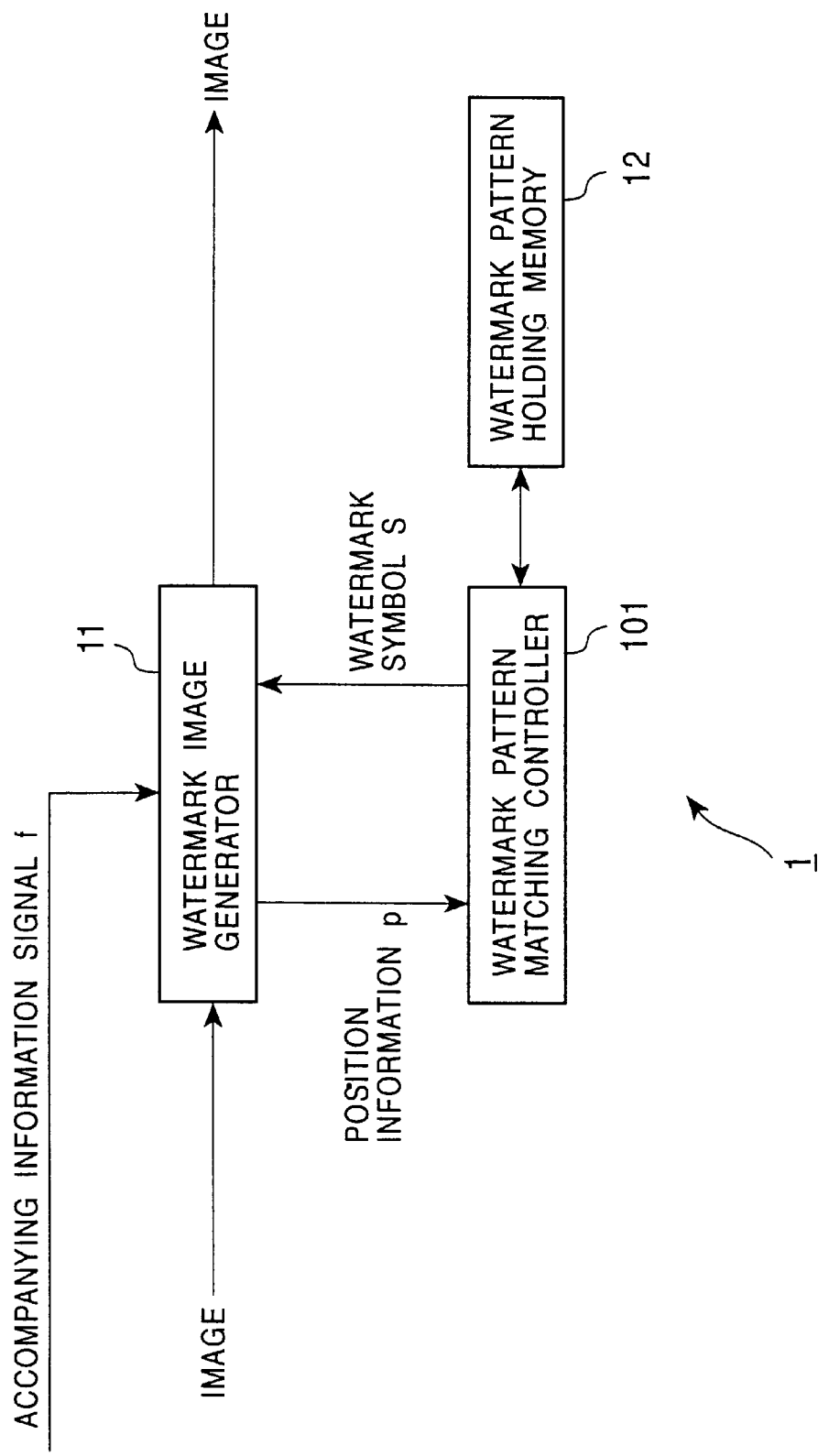
FIG. 34 is a block diagram showing a configuration example of the watermarking device 21 in FIG. 32.
Figure 35:
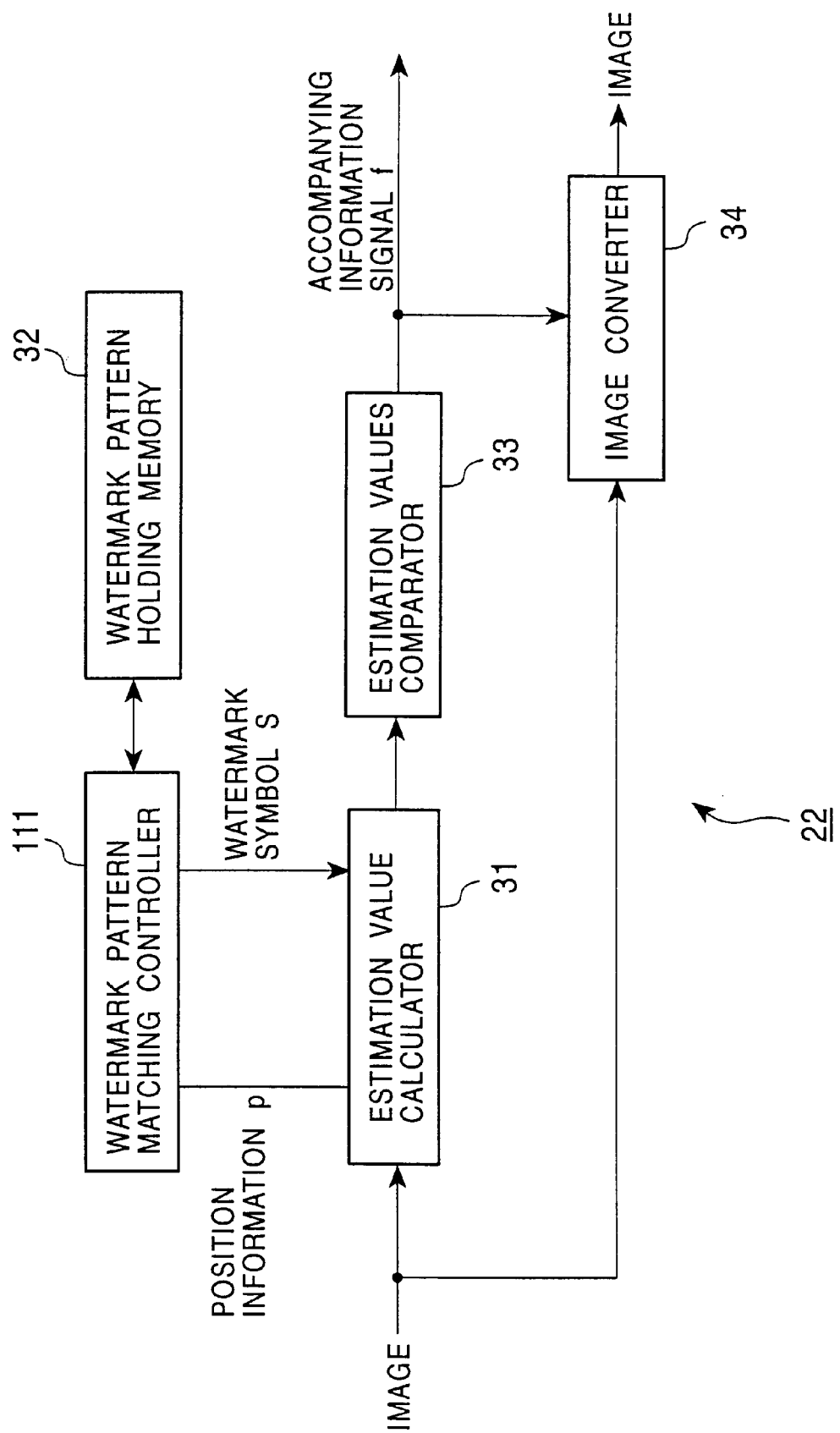
FIG. 35 is a block diagram showing a configuration example of the watermark detector 22 in FIG. 41.
Figure 36:
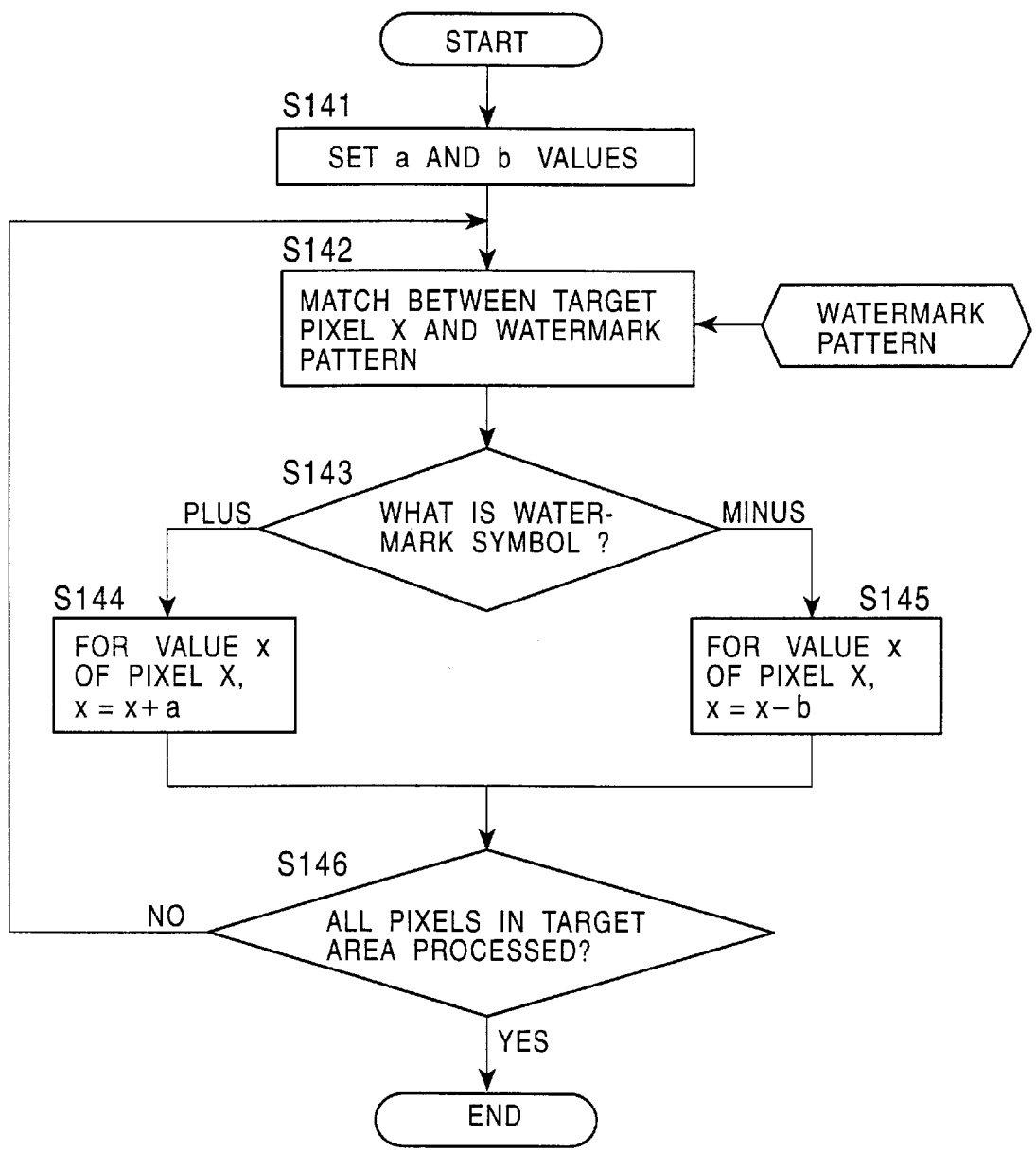
FIG. 36 is a flowchart for illustrating an operation of the watermarking device 1 in FIG. 34.

In contrast, the watermarking device 1 shown in FIG. 1 is configured, for example, as shown in FIG. 2. In FIG. 2, similar parts to those in FIG. 34 are designated by similar reference numerals. This watermarking device is adapted to append a watermark pattern in blocks. The block consists of 8×8 pixels.

The watermarking device shown in FIG. 2 is supplied with a code bit string and an accompanying information signal f. The supplied code bit string is decoded in a simplified fashion by a simplified decoder to locate a position of the code to be watermarked. The position of the code to be located is depending on the type of the target code to be watermarked on a code bit string. As described later more specifically, for example, a coefficient representing a direct current component of DCT coefficient is retrieved. In some cases, the whole or a part of the code bit string is decoded to reproduce the image in whole or in part.

Code position information b which indicates a position of a target code to be watermarked on a code bit string is transmitted together with the supplied code bit string to a watermark image generator 11. If the received accompanying information signal f is on, then the watermark image generator 11 transmits the target code position information p to a watermark pattern matching controller 101 for the purpose of appending a watermark pattern in the target code on the code bit string.

In high-efficiency coding such as MPEG, coding is carried out, for example, in macro blocks, blocks or other units. Therefore, the position information p of the target code to be watermarked generally represents a spatial location thereof. Specifically, for example, the aforementioned position is represented, for example, in one-dimensional expression of indicating the ordinal number of pixel position when counting from an upper left position of the image in a scanning order or in a two-dimensional expression of indicating coordinates thereof in space taking the upper left point of the image as an origin.

The watermark pattern matching controller 101 looks up a symbol of a watermark pattern stored in a watermark pattern holding memory 12, and then transmits the obtained symbol S to the watermark image generator 11. The watermark image generator 11 uses the supplied symbol S for watermarking the target code. More specifically, modification such as replacing the target code to a new code or the like is carried out. In some cases, the reproduced image obtained by decoding may be modified in whole or in part, and then coded again.

Figure 3:
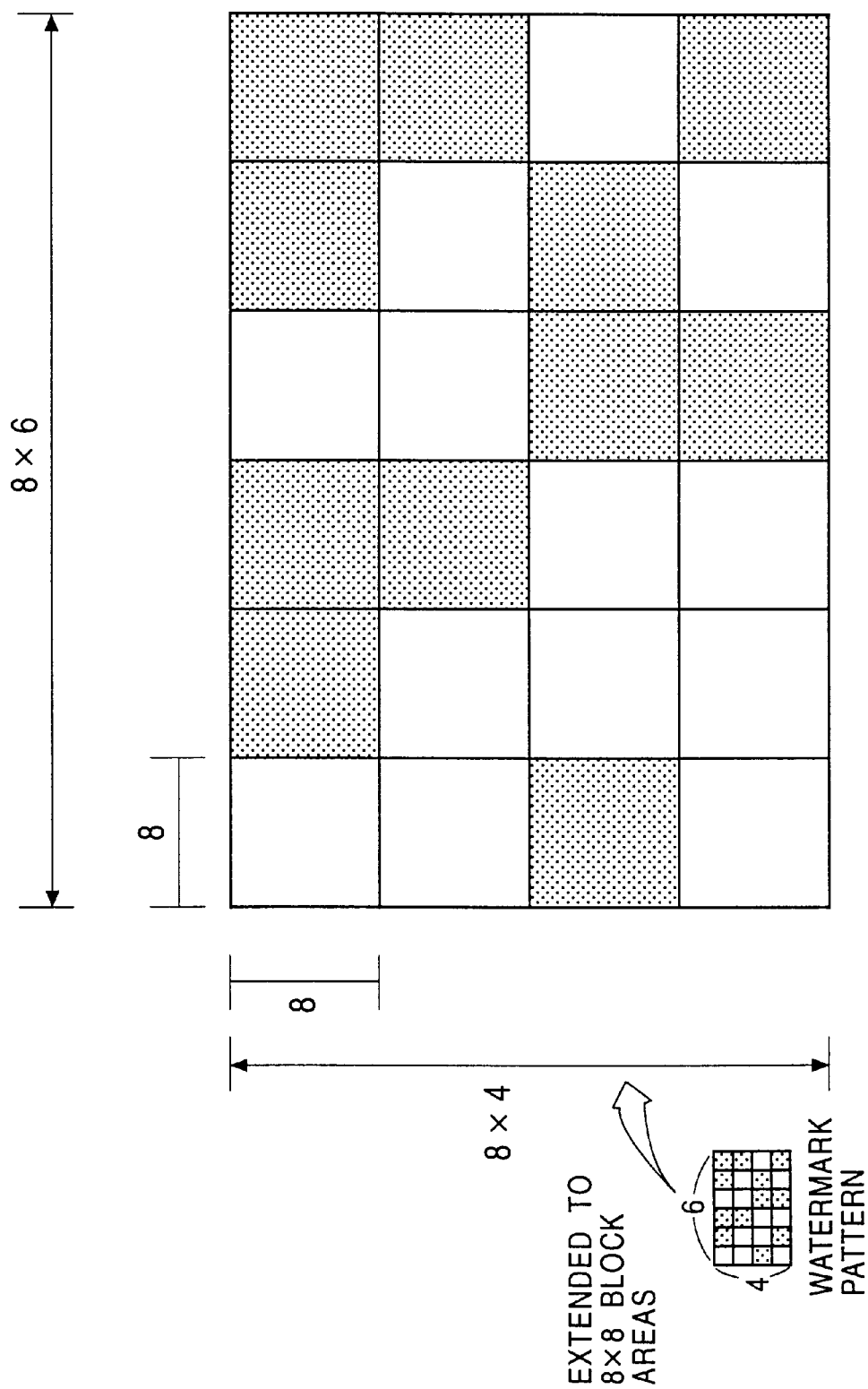
FIG. 3 is a diagram for explaining-enlargement of a watermark pattern.

FIG. 3 shows a conceptual diagram for appending and detecting a watermark pattern in 8×8 pixel blocks. For example, the memory 12 for holding a watermark pattern stores a watermark pattern in pixels in order to save memory capacity. When appending or detecting a watermark pattern in actual, each pixel is enlarged to a block area consisting of 8×8 pixels. In the example shown in FIG. 3, following a rule of bringing one pixel into correspondence with one block (8×8 pixels), a 4×6 pixel watermark pattern is enlarged to 32(=8×4)×48(=8×6) pixels. For enlargement, what is necessary is only copying the symbol of the watermark patter, however, interpolation or other processing may be used for enlargement. Alternately, another method different from the foregoing may be used for handling the watermark pattern in 8×8 pixel blocks.

The reason for appending or detecting a watermark pattern in blocks each of which consist of 8×8 pixels is that many high-efficient coding methods such as JPEG and MPEG carry out DCT in 8×8-pixel blocks. By performing DCT, a block area of 8×8 pixels in terms of picture or space is converted into a block area of 8×8 pixels in terms of frequency. Among other frequency components, especially DCT DC(direct current) components are important. Also in high-efficient coding such as JPEG or MPEG, a DCT DC component is often encoded with special processing in contrast to other frequency components. For example, a DCT DC components is quantized finely, and then coded using a code having a long word length. When as watermark pattern is appended or detected in 8×8 pixel blocks, it is possible to design so that this effect is exerted to the DCT DC components only. Therefore, the watermark can be appended or detected certainly. If an arbitrary high-efficiency coding process or method performs some processing in optional units on image or space or in optional units on frequency, the similar effects as described concerning the present invention can be obtained by appending or detecting the watermark pattern using the aforementioned optional unit.

Figure 4:
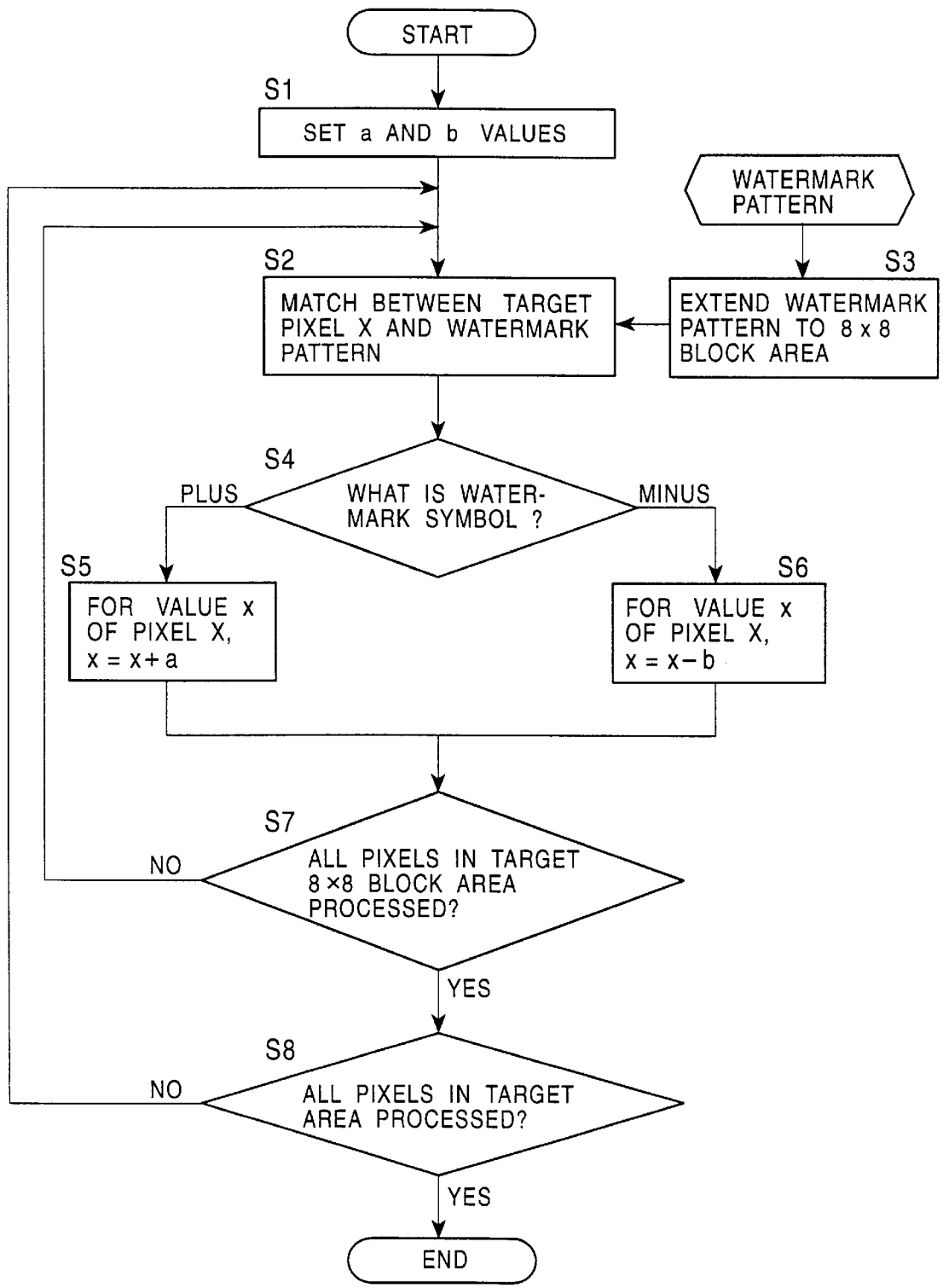
FIG. 4 is a flowchart for illustrating an operation of the watermarking device 1 in FIG. 2.

The watermarking device 1 carries out a series of processing as shown in FIG. 4. First, in step S1, the watermarking image generator 11 sets watermarking levels a and b to predetermined values. In step S2, the watermark pattern matching controller 101 selects an area on a target image having the same size as the watermark pattern area, and then matches each pixel in the selected area against the watermark pattern. At this time, in step S3, the watermark pattern is enlarged to a 8×8 pixel block area through an appropriate method, for example, as shown in FIG. 3, and then used.

In step S4, the watermark image generator 11 discriminates the symbol of the watermark, and if the symbol of the watermark pattern corresponding to the pixel is plus, then the value a is added to the pixel x in step S5. On the other hand, if the symbol of the water pattern corresponding to the pixel is minus, then the value b is subtracted from the pixel x in step S6. In the example shown in FIG. 3, a corresponding range of the watermark pattern symbol at a given pixel position is one block area consisting of 8×8 pixels. Therefore, the aforementioned processing is repeated until step S7 determines that all the pixels in the block area have been processed. Then, similar processing is repeated changing the watermark symbols in turn until step S8 determines that all the pixels in the target area have been processed.

Figure 5:
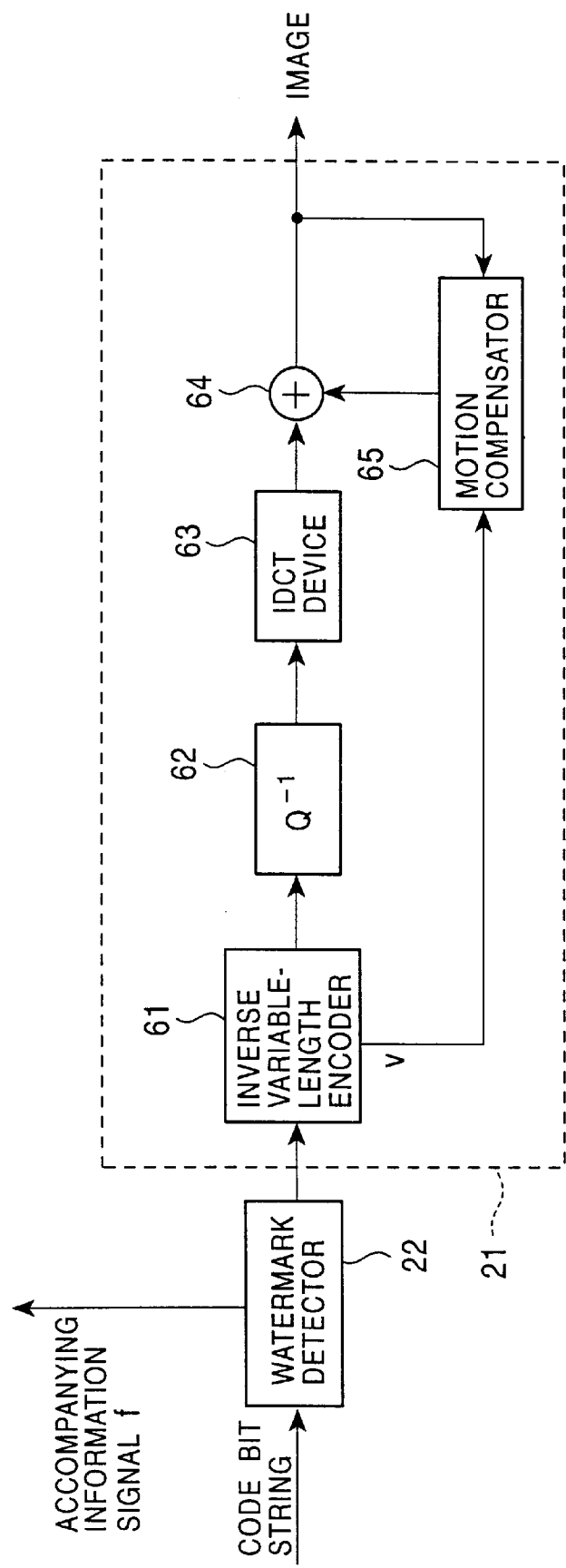
FIG. 5 is a block diagram showing a configuration example of a decoder to which the present invention is applied.
Figure 32:
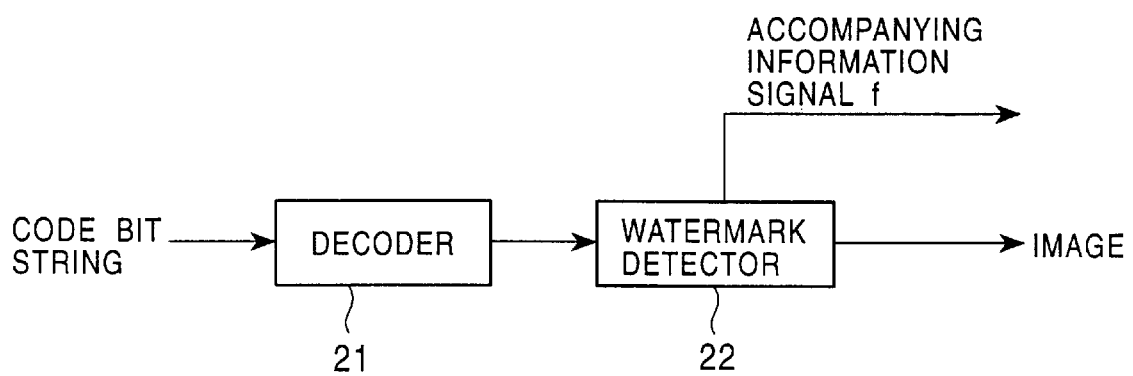
FIG. 32 is a block diagram showing a configuration example of a conventional decoder.
Figure 33:
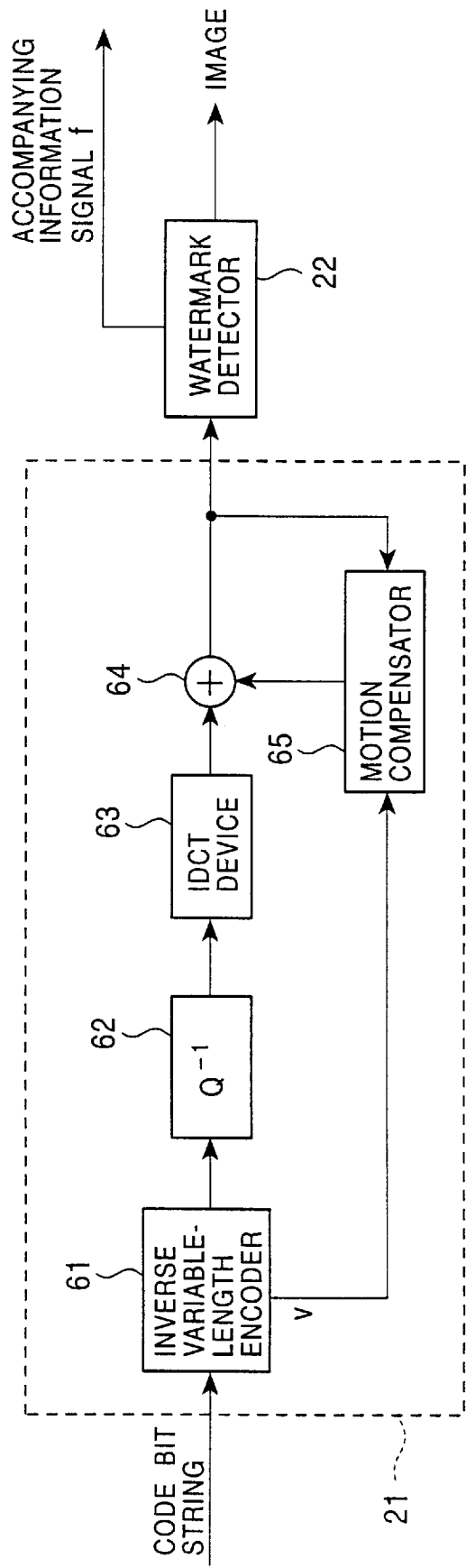
FIG. 33 is a block diagram showing a configuration example of a conventional decoding device 21.

FIG. 5 shows a configuration of the detector in which similar parts to those shown in FIG. 32 and FIG. 33 are designated by similar reference numerals. In this configuration example, a supplied code bit string is first fed to a watermark detector 22 in which a watermark is detected. Then the code bit storing from the watermark detector 22 is supplied to a decoder 21 for decoding. Since the configuration and operation of the decoder 21 is similar to those of the case shown in FIG. 33, descriptions thereof are omitted.

Figure 6:
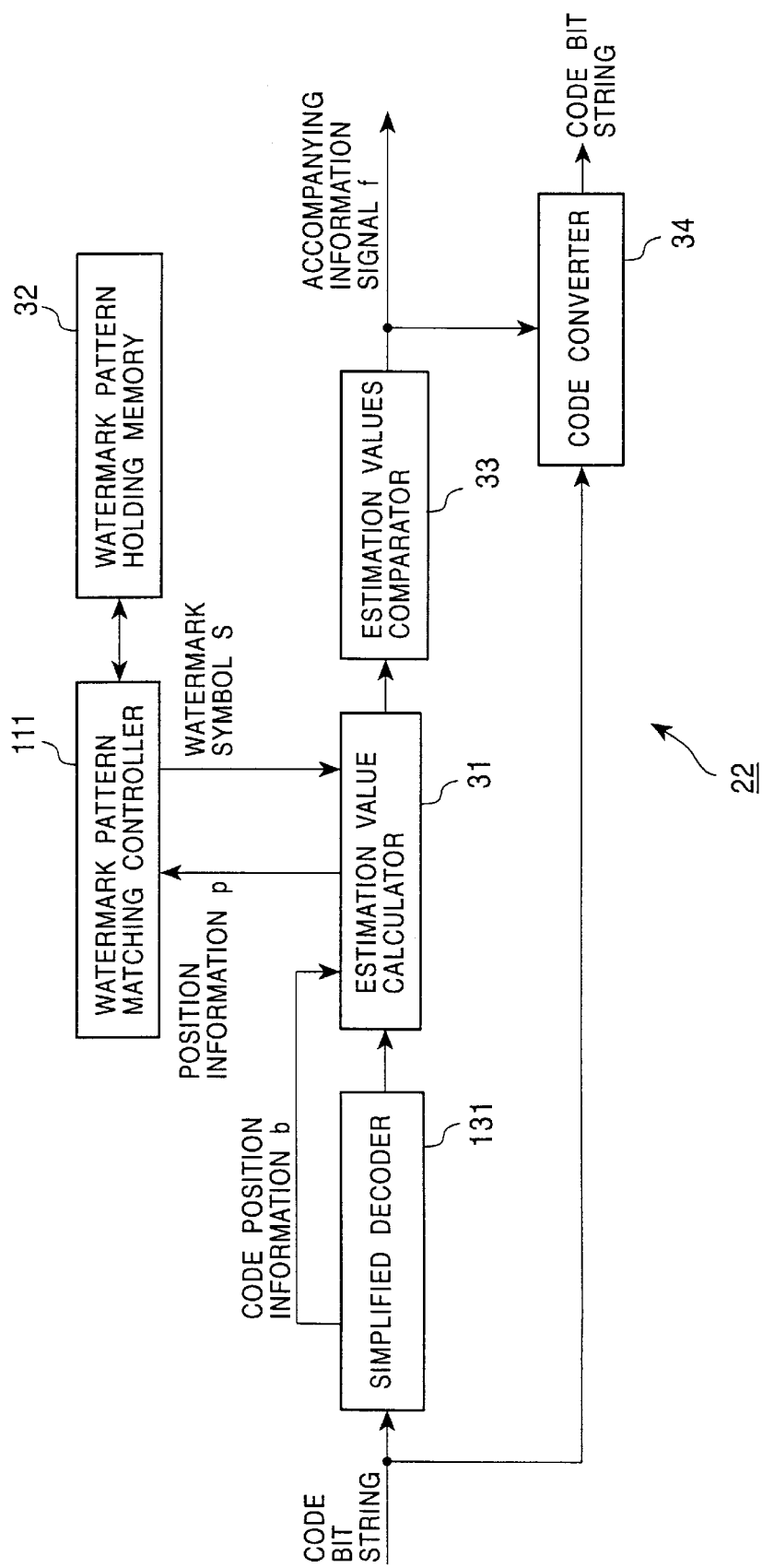
FIG. 6 is a block diagram showing a configuration example of the watermark detector 22 in FIG. 5.

FIG. 6 shows a configuration example of the watermark detector 22 shown in FIG. 5. The watermark detector 22 is supplied with a code bit string. The supplied code bit string is decoded in a simplified fashion by a simplified decoder 131 to locate a position of the code targeted for detecting a watermark. In this case, the position is, for example, a position on a code bit string, a position from the view point of space or frequency when decoded, and the like. Various positions including other positions may be located. Which position of which code is located is depending on the type of the code targeted for detecting a watermark on the code bit string. This is similar to the case as mentioned above concerning the watermarking device 1. In some cases, the whole or a part of the code bit string is decoded to reproduce the image in whole or in part.

Code position information b which indicates a position of a target code when detecting a watermark on a code bit string is transmitted together with the supplied code bit string from a simplified decoder 131 to an evaluation value calculator 31. In order to obtain an evaluation value from each of target codes on the code bit string, the evaluation value calculator 31 sends the code position p targeted for evaluation to a watermark pattern matching controller 111. As is similar to the case as mentioned concerning the watermarking device 1, the code position p may be represented in one-dimensional expression, two-dimensional expression, or other expression.

The watermark pattern matching controller 111 looks up the symbol of the watermark pattern stored in a watermark pattern holding memory 32, and supplies the obtained symbol S to the evaluation value calculator 31. The evaluation value calculator 31 uses the supplied symbol S for calculating an evaluation value. Similar to the case as described concerning the watermarking device 1, the watermark is used after enlarged to a predetermined block. The obtained evaluation value is subjected to thresholding in an evaluation value comparator 33, and then an accompanying information signal f is sent therefrom. The supplied image data is sent through a code converter 34 as it or subjected to a predetermined handling or processing. If the accompanying information signal f is off, then the code converter 34 performs some handling or processing such as not sending the code bit string, rearranging the code bit string at random, or the like.

Figure 7:
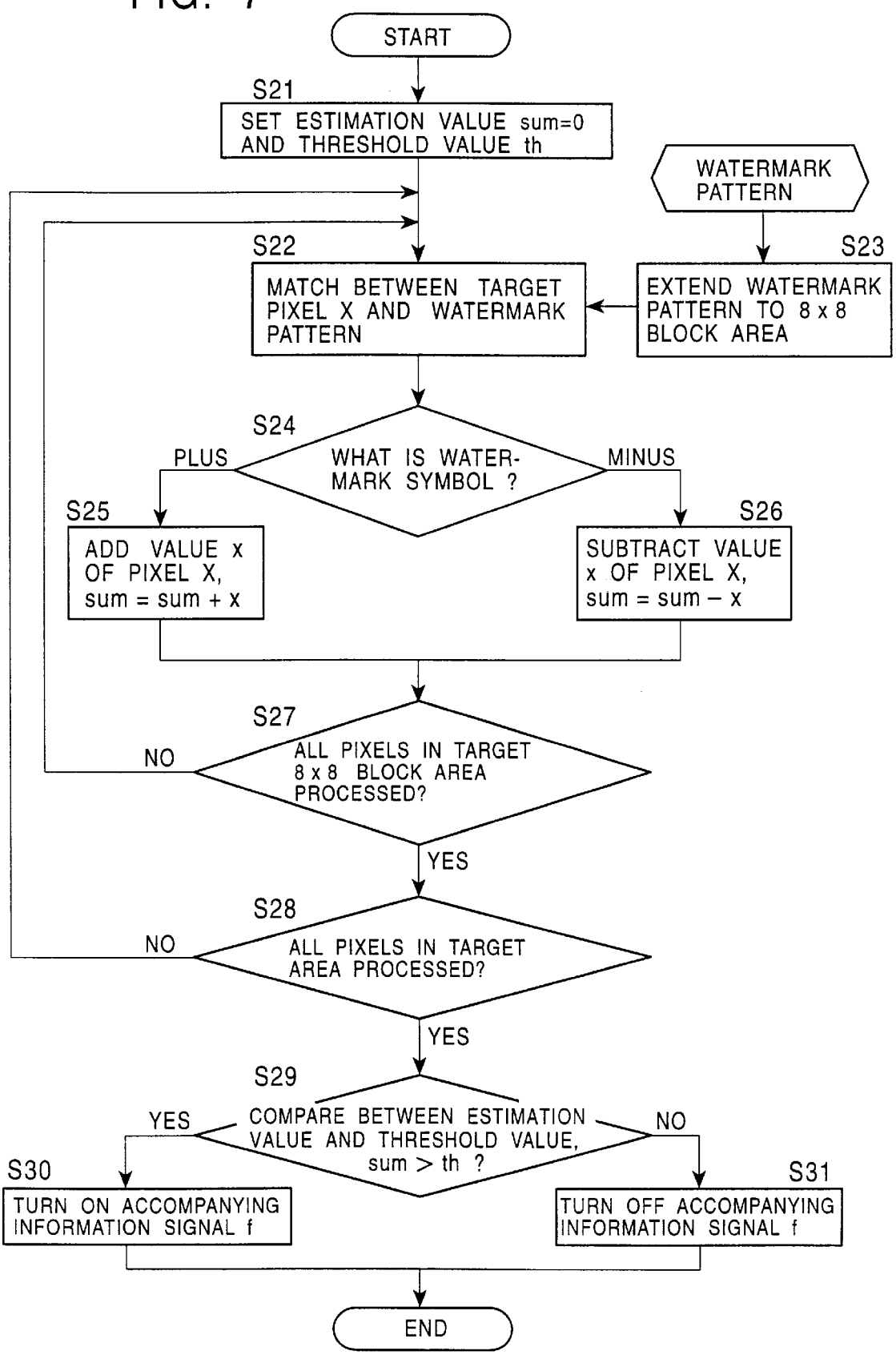
FIG. 7 is a flowchart for explaining an operation of the watermark detector 22 in FIG. 5.

The watermark detector 22 carries out a series of processing as shown in FIG. 7. First, in step S21, the evaluation value calculator 31 and the evaluation value comparator 33 initializes an estimation value sum to zero and set a threshold value "th" to a predetermined value, respectively. In step S22, the watermark pattern matching controller 111 selects an area equal to a watermark pattern area in size, and then subjects each element in the selected area to matching against the watermark pattern. At this time, as in the case as mentioned concerning the watermarking device 1, the watermark pattern is enlarged to a 8×8 pixel block area through an appropriate method for example as shown in FIG. 3, and then used. The evaluation value calculator 31 discriminates the symbol of the watermark, and if the symbol is plus, then the pixel value x is added to sum in step S5. On the other hand, if the symbol of the water pattern corresponding to the pixel is minus, then the pixel value x is subtracted from the evaluation value sum in step S26.

In the example shown in FIG. 3, a corresponding range of the watermark pattern symbol at a given pixel position is one block area consisting of 8×8 pixels. Therefore, the aforementioned processing is repeated using the same symbol until step S27 determines that all the pixels in the block area have been subjected to similar processing. Then, the foregoing processing is repeated changing the watermark symbols in turn until step S28 determines that all the pixels in the target area have been processed. After that, in step S29, the evaluation comparator 33 compares the evaluation value sum with the threshold value "th". If the result is sum>th, then it is determined that the watermark is appended, and an accompanying information signal f is turned on in step S30. If not, then the accompanying information signal f is turned off in step S31.

Figure 27:
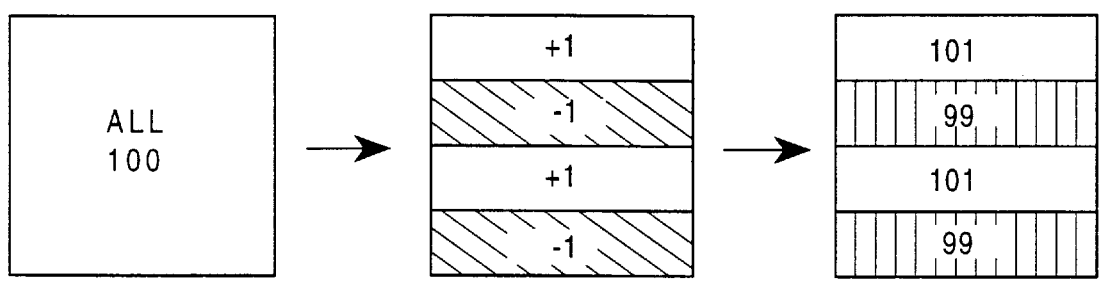
FIG. 27 is a diagram for illustrating an operation of appending a watermark.
Figure 28:
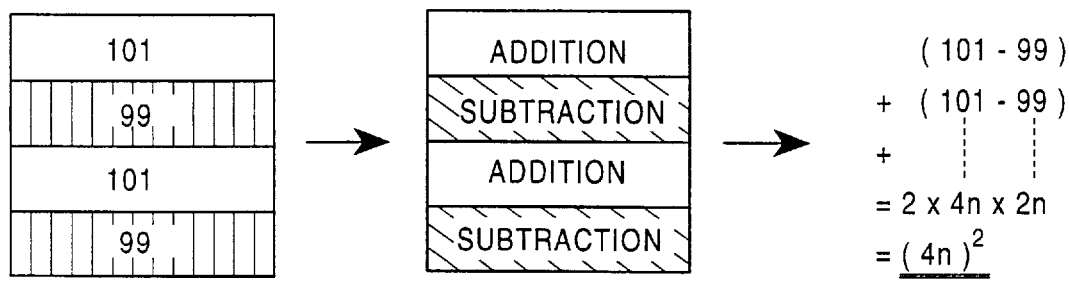
FIG. 28 is a diagram for illustrating an evaluation value when a watermark is appended.
Figure 29:
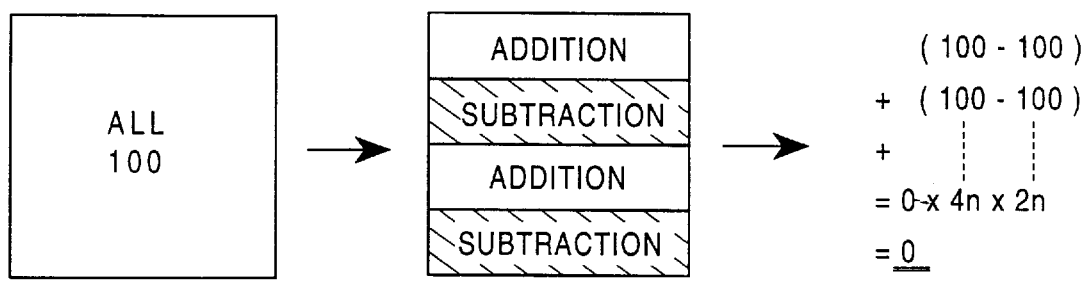
FIG. 29 is a diagram for illustrating an evaluation value when a watermark is not appended;.

For comparing the evaluation value sum with the threshold value "th", any comparing method other than mentioned above may be used. For example, by using that a bias component B of the evaluation value (difference between the evaluation value when a watermark pattern is appended and the evaluation value when no watermark pattern is appended) (in the example of FIG. 28 and FIG. 27, $(4n)^2$) is constant, comparison may be performed together with a bias confidence coefficient c ($0 \leq c \leq 1$) indicating the degree that the bias component is held. Alternately, a watermark may be detected by calculating a standard evaluation value through some appropriate method and comparing this value with an actual evaluation value.

Any symbols other than plus and minus may be used as watermark symbols. Further, not only 2 kinds, but 3 or more kinds of symbols may be used. Still further any meaning may be given to each of such symbols. For example, it is possible to provide 3 kinds of symbols plus, zero, and minus, and design so that a pixel whose symbol is zero does not affect an evaluation value sum (not adding the pixel value to nor subtracting from the evaluation value) when matching against the watermark pattern.

The area to be watermarked may have optional shape and range. As long as consistent with the appended watermark pattern, the shape and range of the area used for obtaining the evaluation value at a time of detection may be optional. It is true for a image area where the same watermark pattern symbol is used for processing such as each of 8×8-pixel block areas. By way of example, not the whole but a part of each block area consisting of 8×8pixels may be used for appending or detecting a watermark pattern. In addition, a watermark pattern may be adapted to be appended or detected using a wider area than the area over time or space. For example, in time-varying image sequence, past or future frames may be used as well as a temporal position of the current frame based on a time criterion. For example, in the case of a still image having a very large image size, the image may be processed by dividing it into a plurality of image areas through the use of a certain unit, and an image area located before and after the currently targeted image area in the scanning order may be used based on a spatial criterion.

Figure 8:
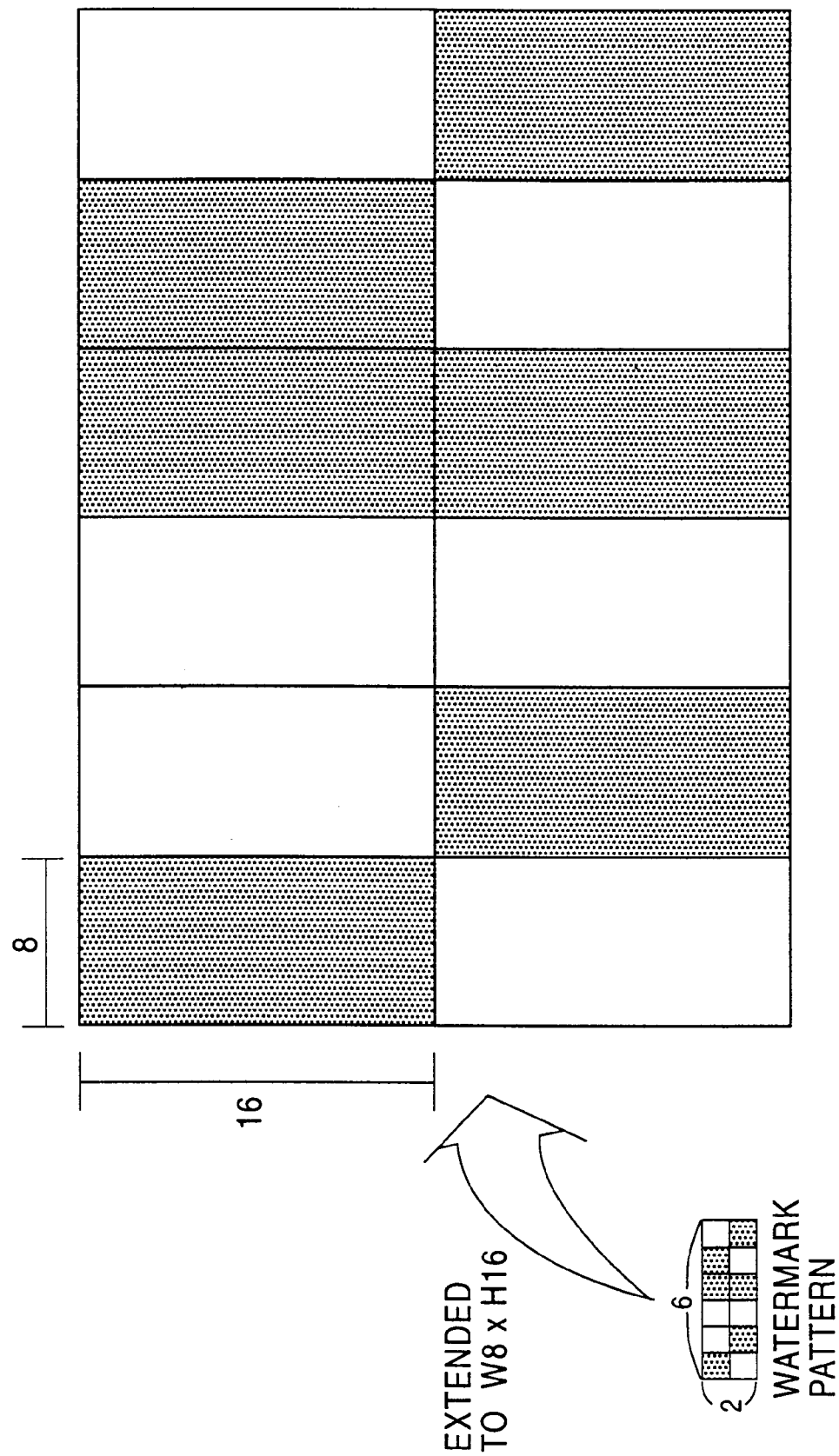
FIG. 8 is a diagram for illustrating another enlarging example of a watermark pattern.

Thus, as a second embodiment for enlarging and blocking a watermark, a watermark pattern may be appended or detected regarding two vertically-adjacent blocks (8 pixels in width×16 pixels in height) as a unit of processing (regarding the vertical length of the block as an integral multiple of the vertical length of the macro block), as shown in FIG. 8.

The reason that appendage or detection of a watermark pattern is carried out in two vertically-adjacent block units of W8×H16 is as follows.

In MPEG, coding is carried out using a macro block as a unit as shown in FIG. 9. When 4:2:0 format is used, the macro block is composed of 6 blocks in total. Four of them area luminance block (Y), and two of them are color-difference blocks (Cb, Cr) which are spatially corresponding to each other. The size of each block is 8×8 pixels.

Figure 10:
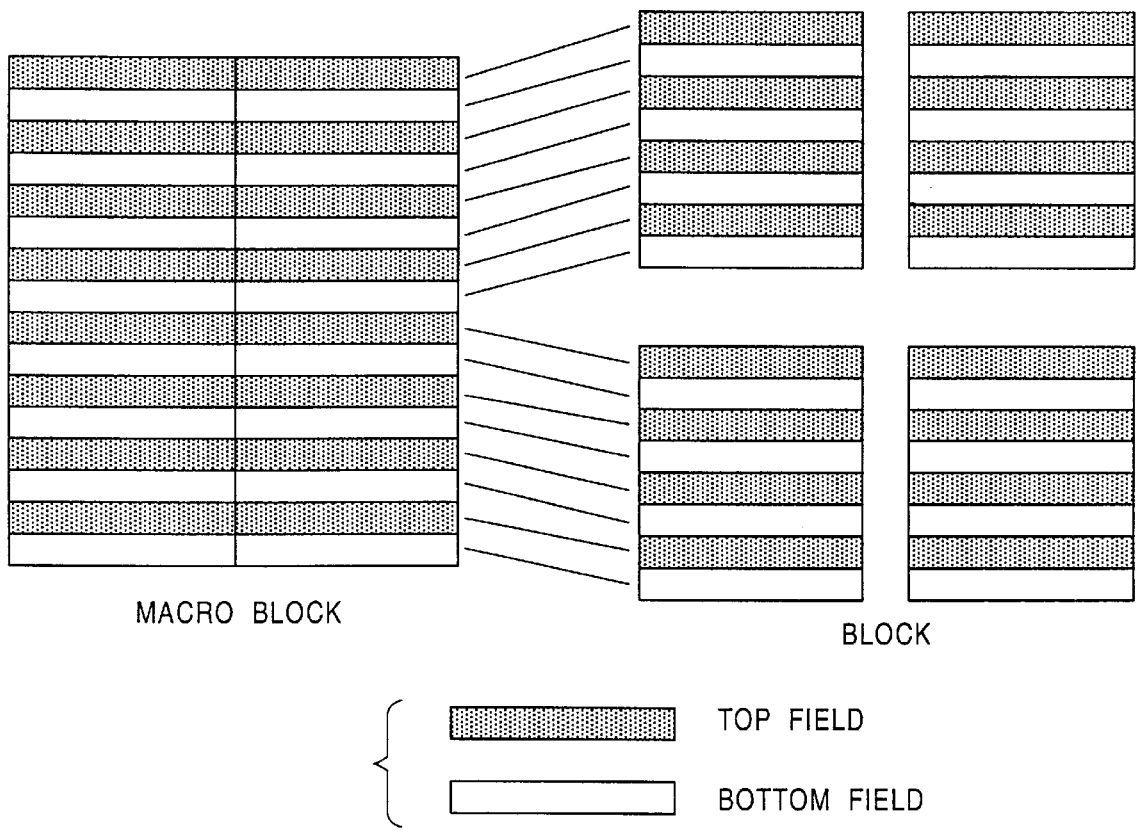
FIG. 10 is a diagram for illustrating frame DCT mode.
Figure 11:
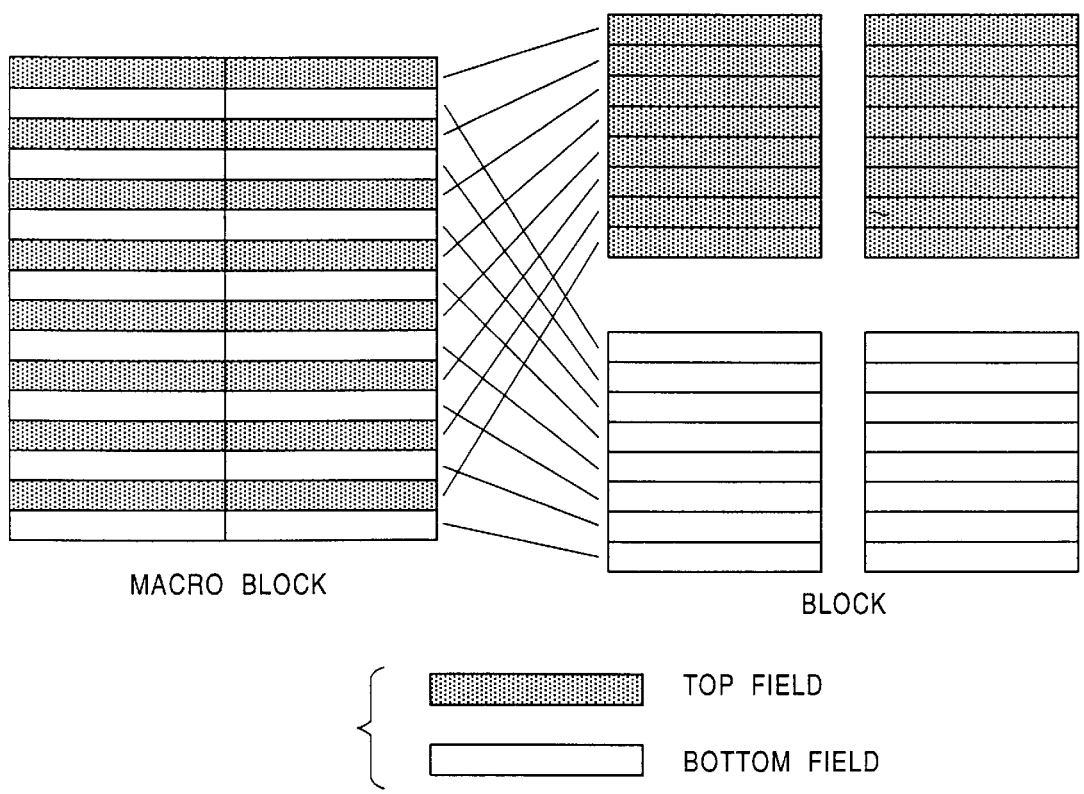
FIG. 11 is a diagram for illustrating field DCT mode.

In MPEG2 for interlace images, two types of DCT coding modes can be switched in macro blocks during interpicture coding or intra-picture coding. FIG. 10 and FIG. 11 show conceptual diagrams thereof. In the frame DCT mode shown in FIG. 10, each block is decomposed so that it consists of frames. On the other hand, in the field DCT mode shown in FIG. 11, each block is decomposed so that it consists of fields. MPEG2 enhances the coding efficiency relative to interlace images by switching these two DIC modes adaptively.

Here is considered the case where the field DCT mode is selected in a given macro block in the process of coding of MPEG2 and a watermark pattern is appended in 8×8-pixel block areas. In this case, if watermark pattern symbols of the two vertically-adjacent luminance blocks are different to each other in the macro block, the same watermark pattern component is appended in a field DCT mode block provided for DCT. Because of this, when restored to a first macro block state, the same symbol emerges both in the upper and lower blocks. Accordingly, the watermark pattern components in these blocks contain other frequency components than DC components, and therefore it becomes impossible to append a watermark certainly.

When two vertically-adjacent blocks (8 pixels in width× 16 pixels in height) is used as a unit of appending or detecting a watermark pattern, such problem does not occur, and therefore the watermark can be appended or detected certainly.

If an arbitrary high-efficiency coding device or method defines an arbitrary unit in terms of image i.e., space, or frequency, and carries out some processing over two or more through the use of such a unit, then the similar effect as described concerning the present embodiment can be obtained by appending or detecting the watermark pattern over two or more.

Figure 12:
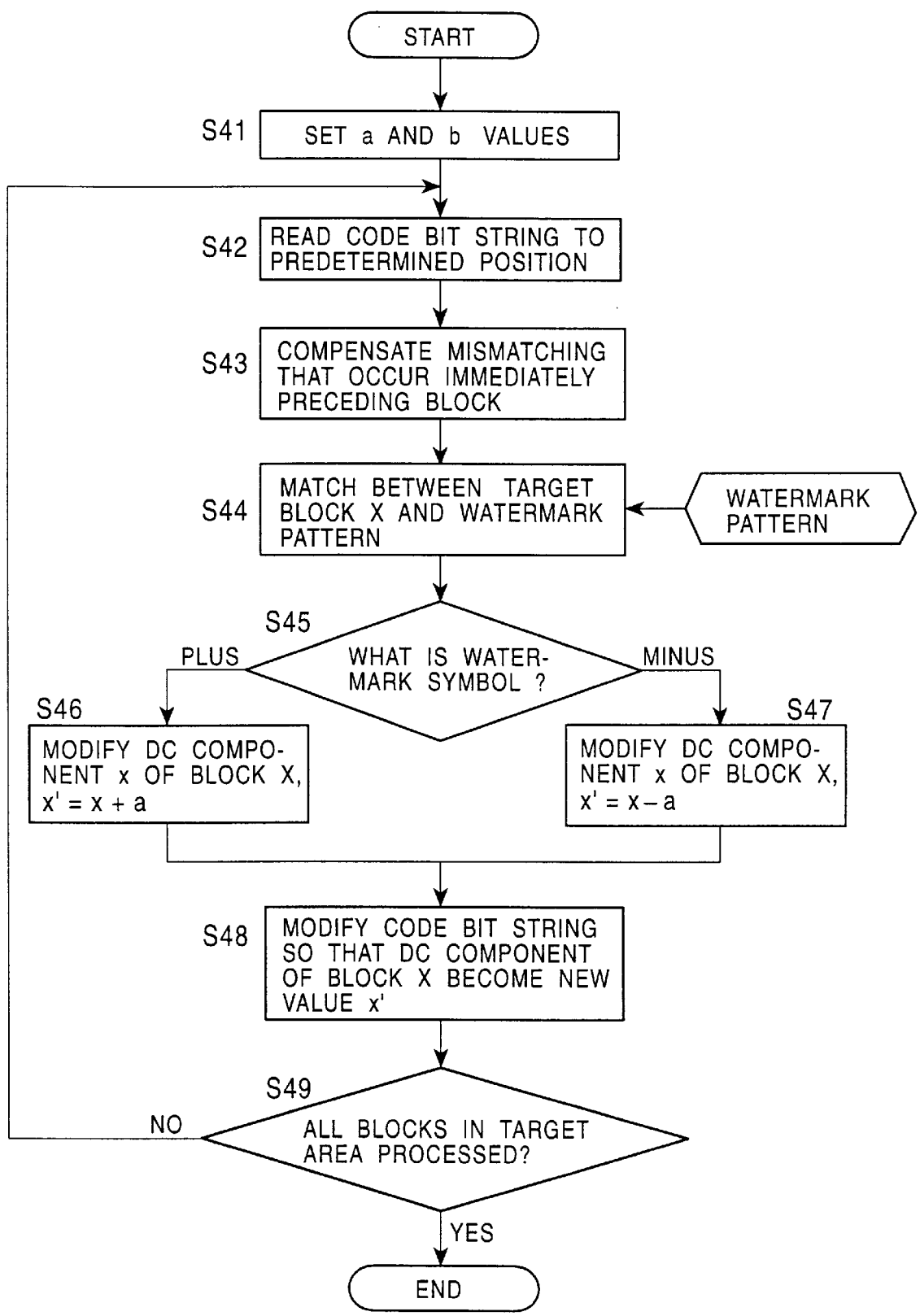
FIG. 12 is a flowchart for illustrating another operation example of the watermarking device 1.
Figure 13:
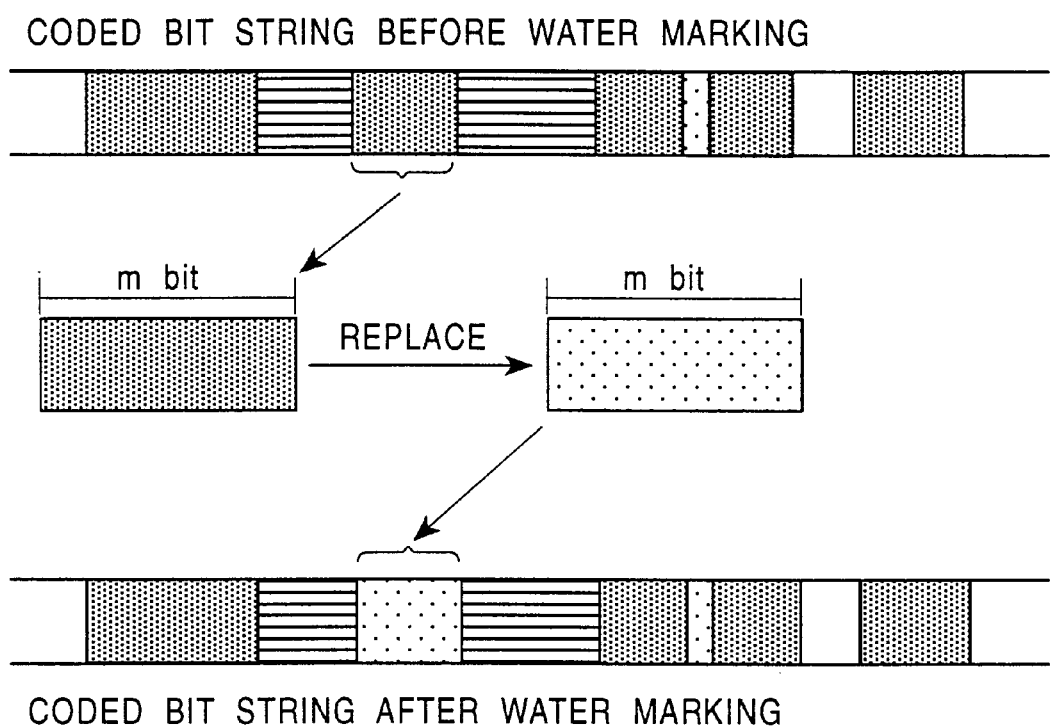
FIG. 13 is a diagram for illustrating replacement processing for a fixed length code part.

FIG. 12 shows another processing example of a watermarking device 1. In the processing example of this third embodiment, a watermark is processed in pixels without blocking. (Of course, it may be processed after blocking.) The configuration of the watermarking device 1 in such a case is similar to that shown in FIG. 2. First, in S41, a watermark image generator 11 sets watermarking levels a and b to predetermined values. In step S42, a simplified decoder 121 reads a code bit string to a position targeted for watermarking thereon. Then, in step S43, compensation processing against mismatching which occurs in a preceding block is appropriately carried out. This is described later in detail.

In step S44, a watermark pattern matching controller 101 performs matching against a watermark pattern depending on the block position of a target code on a code bit string. For example, when a watermark is appended to a DCT DC component code, the watermark matching controller 101 discriminates a symbol of the watermark at the block position in step S45, and if the symbol is plus, then the value x' is calculated in step S46 by adding a to the DC component x represented by the code. On the other hand, if the symbol of the water pattern at the block position is minus, then the value x' is calculated in step S47 by subtracting a from the DC component x represented by the code. After that, in step S48, the watermark image generator 11 modifies the code of the DC component x at that block position to the code of x'. If this code is a fixed-length code part, then the modification processing is performed by simply replacing codes. The foregoing processing is repeated until S49 determines that all codes in the target area have been processed.

Next, a specific example of processing in step S43 will be given. In MPEG, DCT DC components are subjected to differential coding (DPCM, i.e., differential pulse code modulation). In DPCM, for example, if there is a series of 3, 6, 12, 4, and 7, difference with a preceding value is calculated for each value, thereby modifying the series to a resultant series of 3, 3, 6, −8, and 3, and subjecting coding to the new series. At this time, for example, if the third differential value is replaced with 4 and a watermark is added, and if not compensated, the fourth or later values become smaller by 2 than the intrinsic values. In order to compensate the fourth or later values, what is required is replacing the forth differential value with a two larger value, that is, −6. Thus, when compensation processing is performed, the processing method may be determined depending on the watermarking method.

In the foregoing, the example of appending a watermark, for example, using a macro block or a block as the unit of processing. More generally, as long as the processing is performed with providing a necessary configuration, any unit of processing may be used for watermarking, without limited to a macro block or a block. However, an actual code bit string is generated in conformance with various constraints such as a coding rate and the like. For example, if a target code to be watermarked is replaced with a new code, the word length of the code is changed by the replacement in many cases, thereby various problems are caused.

In order to prevent such problems, some artifice is required such as examining a code to be targeted for appending a watermark on a code bit string and appending the watermark to a fixed-length code part only so that the word length is not changed before and after the appendage of the watermark. In MPEG, fixed-length coding is carried out with a DCT DC component which is coded in blocks, a motion vector which is coded in macro blocks, and the like. Especially when a DCT DC component code is selected for the target of appendage, generality is increased since this value is subjected to fixed-length coding in blocks in JPEG and the like.

Watermark may by appended using a code other than a fixed-length code (that is, variable-length code). In this case, however, processing should be carried out taking a required step such as inserting an unnecessary bit in the code bit string, deleting an unnecessary bit in the code bit string, or the like. The foregoing is similarly applicable in a given coding method or a given decoding method.

Figure 14:
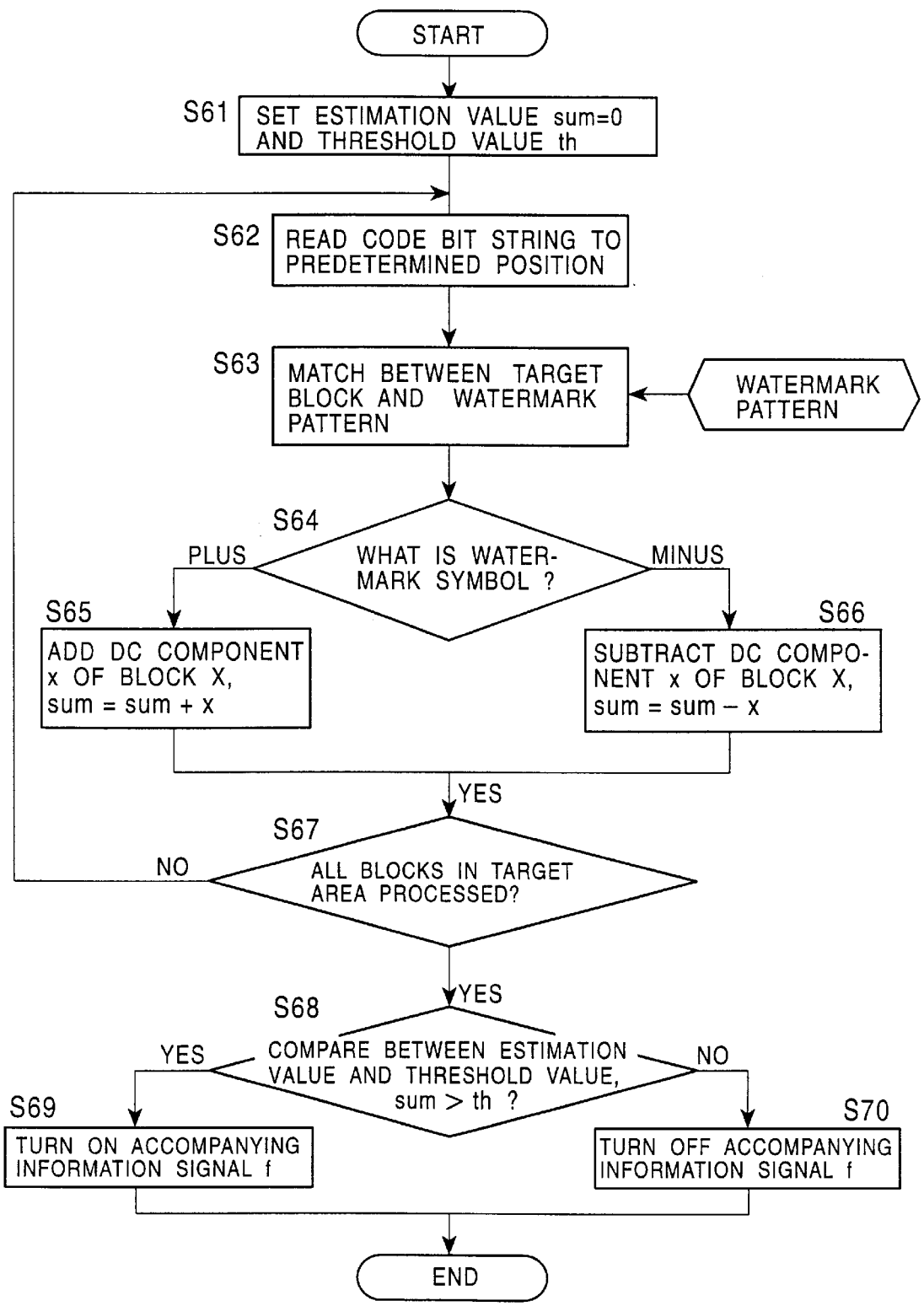
FIG. 14 is a flowchart for illustrating another processing example in the watermark detector 22.

FIG. 14 shows detection processing corresponding to the appendage processing in FIG. 12. This detection processing is carried out in the same configuration as of the watermark detector 22 in FIG. 6. First, in step S61, an estimation value sum is initialized and a threshold value "th" is set by an estimation value calculator 31 and an estimation value comparator 33, respectively. In step 562, a simplified decoder 131 reads a code bit string to a position targeted for watermarking thereon. Then, in step S63, a watermark pattern matching controller 111 performs matching against a watermark pattern depending on the block position of the code on a code bit string to be targeted.

For example, in the case of appending a watermark to a DCT DC component code, the evaluation value calculator 31 discriminates a symbol of the watermark corresponding to the code in step S64, and if the symbol is plus, then the evaluation value calculator adds the DC component x represented by the code to the evaluation value sum in step S65. On the other hand, if the symbol of the water pattern corresponding to the pixel is minus, then the evaluation value calculator 31 subtracts the DC component x represented by the code pixel value from the evaluation value sum in step S165. The foregoing processing is repeated until step S67 determines that all the code in the target area have been processed.

Subsequently, in step S68, the evaluation comparator 33 compares the evaluation value sum with the threshold value "th". If the result is sum>th, then it is determined that the watermark is appended, and an accompanying information signal f is turned on in step S69. If not, then the accompanying information signal f is turned off in step S70.

As long as considered that the processing nature of appendage or detection of a watermark is equivalent, the configuration of the present embodiment may be combined with a configuration of the prior art, the first and second embodiments, or others.

As mentioned above, as long as the processing is performed with providing a necessary configuration, any unit of processing may be used for appending or detecting a watermark, without limited to a DCT DC component code. It should be noted that a watermark can be appended more easily without changing the length of the code of the code bit string in the case a watermark is appended to a fixed length code part and detected. In MPEG, subjected to fixed length coding is a DCT DC component which is coded in blocks, a motion vector which is coded in macro blocks, and the like. Then, more detail description concerning this will be given hereinafter.

Figure 15:
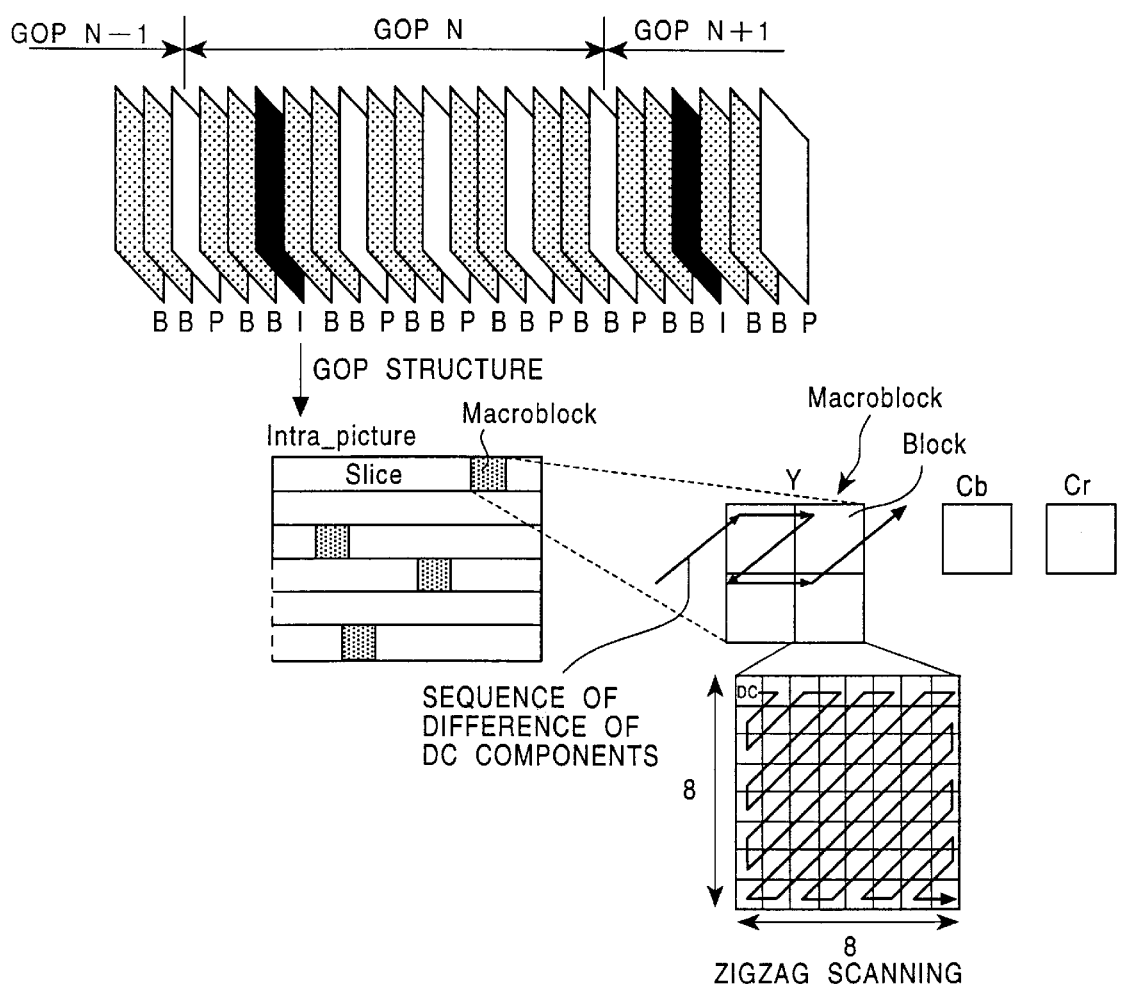
FIG. 15 is a diagram for showing a GOP structure.

FIG. 15 shows the principle of appending a watermark in MPEG method. As is shown in the figure, a GOP (Group Of Picture) is composed one I-picture, a plurality of P-pictures, and a plurality of B-pictures. In the example shown in FIG. 15, one GOP is composed of 15 pictures. In the case where a watermark pattern is appended to a DCT DC component to be coded in blocks, the I-picture is selected from the remaining pictures composing the GOP.

In the case of a luminance signal (Y), a macro block of 16×16 pixels is composed of 4 blocks of 8×8 pixels as shown in FIG. 9. A color difference signal Cb, Cr is represented by a block of 8×8 pixels relative to one macro block of 16×16 pixels. Each of these pixel data is converted into a DCT (discrete cosine transform) coefficient through DCT conversion.

The 8×8 DCT coefficients of one block, Coeff[0][0] to Coeff[7][7] are quantized through a predetermined quantizing step, and converted into quantization levels QF[0][0] to QF[7][7].

Among the DCT coefficients, Coeff[0][0] (scan [0]) at the upper-left corner represents a direct current component (DC component). Based on the DC component, a differential value is calculated using a DC component of the preceding block as a predicted value, and the differential value is coded. The remaining alternating current components (AC components) are rearranged in a block in the order from scan [1] to scan [63] following scan [0] as an AC component through zigzag scanning, and then coded.

Figure 16:
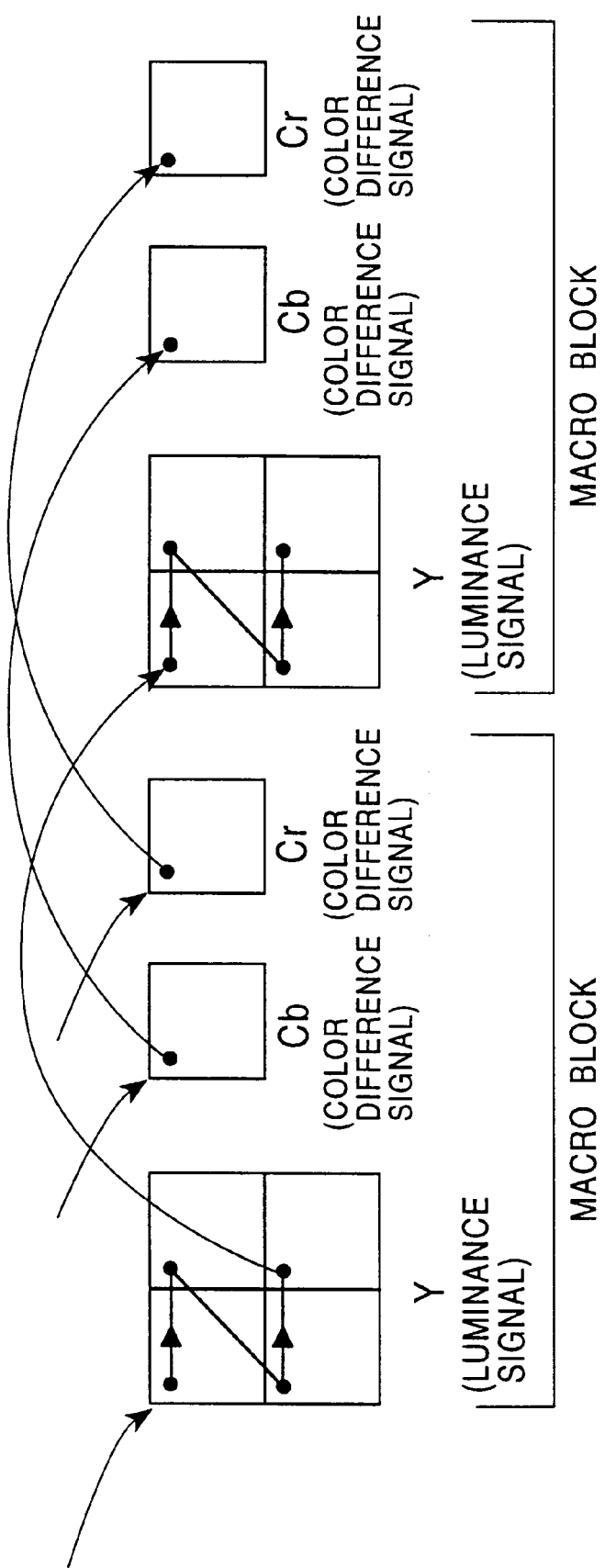
FIG. 16 is a diagram for illustrating coding of a DCT coefficient DC component.

As shown in FIG. 16, a DC component among the DCT coefficients is subjected to calculation and a differential value with the preceding DC component is obtained, and this differential value is then coded. In the case of luminance signals, the order of the four blocks are upper-left, upper-right, lower-left, and lower right. Accordingly, the DC component of the upper-left block is subjected to differentiation processing with the DC component of the lower-right block of the precedent macro block and the resultant differential value is coded. The DC component of the upper-right block is subjected to differentiation processing with the DC component of the upper-left block and the resultant differential value is coded. The DC component of the lower-left block is subjected to differentiation processing with the DC component of the upper-right block and the resultant differential value is coded. The DC component of the lower-right block is subjected to differentiation processing with the DC component of the lower-left block and the resultant differential value is coded.

In the case of a color difference signal, the difference with the DC component of the preceding color difference signal block corresponding thereto is coded.

When a differential value of a DC component is coded as mentioned above, the DC component is represented by a form that a size and the actual value represented by the size (DC Differential) are combined. The former is classified as a variable length code (VLC) and the latter is classified as a fixed length code (FLC).

For example, for luminance signals, the size of DC components (DC differential components) is defined as listed in FIG. 17A, and for color difference signals, defined as listed in FIG. 17B. For example, if the size of a DC component (DC differential component) is 3, the DC differential component is defined as shown in FIG. 18.

Accordingly, in the case of luminance signal, if the size of a DC component (DC differential component) is 3 ("101" of VLC in FIG. 17A and the actual DC differential component zz [0] is −6 ("001" of DCT Differential in FIG. −18), the difference value is represented as 101001 by combining "101" and "001".

When appending a watermark, if a DC differential component is changed within the range that the size of the DC component (DC differential component) does not change, then the watermark can be appended using a fixed-length part only.

Here is considered a case where the size of a DC differential component of a luminance signal is 3, and an actual DC differential component zz [0] is −6. When the symbol of the watermark pattern is plus and the appendage level a is 1, the differential value is replaced from 101001 to 101010. As a result, the actual DC differential component becomes larger than the actual DC differential component −6 by 1, i.e., −5. On the other hand, when the symbol of the watermark pattern is minus and the appendage level b is 1, the differential value is replaced from 101001 to 101000. As a result, the actual DC differential component becomes smaller than the actual DC differential component −6 by 1, i.e., −7.

Similarly, in the case where the size of a DC differential component of a luminance signal is 3 and an actual DC differential component zz [0] is −6, if the symbol of the watermark pattern is plus and the appendage level a is 3, the DC differential value zz [0] of −3(=−6+3) is not defined as listed in FIG. 18. Therefore, it is possible to append the watermark using the fixed length code part only. In this case, the watermark is not appended at this block position. Alternatively, for example, since it is possible to append the watermark to the fixed length code position when the appendage level is 2 or less, the differential value may be replaced from 101001 to 10101. At this time, the fact that an actual DC differential component becomes than −6 by 2, i.e., −4 is recorded in a register or the like, and the value should be used when next appendage is carried out relative to the DC differential components. Details concerning this will be mentioned later.

When the size of a DC component is 0, that is, an actual DC differential component zz [0] is 0, a watermark can not be appended using the fixed length code part only. Therefore, appendage of a watermark is not carried out at the block position. Alternatively, some processing may be employed to allow appendage of a watermark.

Actual shift amount of a DC component caused by watermarking is recorded in a register or the like, referred to when next appendage is carried out relative to the DC differential components, and then used as follows. For example, if the actual value of the DC component is larger than the intrinsic value by 2 due to the preceding watermark appendage, 2 is recorded in the register (R=2). At a time of next appendage, the size of the DC differential component of the luminance signal is 3 when an actual DC differential component zz [0] is 7. In order to append a watermark in the case where the symbol of the watermark pattern is minus and the appendage level b is 1, it is necessary, considering that the DC component is differential coded, to change the DC differential component to −R−b=−2−1=−3. For that purpose, the differential value is replaced from 101111 to 101100 and the actual DC differential component is changed from 7 to 4, and an operation R=2−3=−1 is carried out in order to record the fact that the actual value of the DC becomes smaller by 1. The actual shift amount of the DC component caused by appendage of a watermark may be recorded through other methods than that mentioned above.

It should be noted that any other method except that mentioned above may be used for appendage of a watermark using a DC component (DC differential component).

In the description concerning the aforementioned embodiment, appendage of a watermark using a DC component (DC differential component) is described, however, it is also possible to use Motion_residual (FLC) in a code obtained by coding a differential value of a motion vector.

In other word, taking a conventional example shown in FIG. 31, in MPEG method, a motion vector detector 40 detects motion vectors of a P-picture and a B-picture, embeds the vectors in a bit stream after coding, then transmits the resultant bit stream. Each of the motion vector is represented by Motion_Code classified as VLC as shown in FIG. 19 and Motion_residual as FLC. The Motion_code represents a rough value of the motion vector, and the Motion_residual represents a correction value for indicating a precise value. f_code represents an accuracy (scaling) of the Motion_code.

For example, when f_code is 1, the Motion_code indicates a value of accuracy 0.5. Thereby a sufficiently precise value is expressed, and therefore the Motion_residual is not used in this case.

When f_code is 2, the Motion_code indicates an integer accuracy, and the Motion_residual indicates a value of accuracy 0.5. Thus, the Motion_residual is expressed by 1 bit FLC which indicates 0 or 0.5.

In addition, when f_code is 3, the Motion_code indicates an accuracy of multiples of 2, and the Motion_residual becomes 2-bit FLC which represents 0, 0.5, 1.0, or 1.5.

As in the case of the DC Differential, Motion_residual does not exist when Motion_code is 0.

It is possible to allow Motion_residual, which is FLC as mentioned above, to have a watermark appended thereto as in the case of DC differential mentioned above.

When detecting a watermark, calculating an evaluation value needs only be carried out, for example, by adding or subtracting a motion vector or the differential value thereof. However, all other methods may be used for detecting the watermark.

Motion_residual exits in both the P-picture and B-picture. If it is adapted so that the Motion_residual of the B-picture is used, the B-picture is not used for predicting other pictures, therefore influences exerted to other pictures can be prevented.

By the way, as a forth embodiment, the watermark pattern appendage level may be variable, for example, from one target area to another when a watermark pattern is appended. By configuring as mentioned above, it becomes possible to increase appendage amount of a watermark within the range to an invisible extent, and eliminate false detection during detection. In this case, since the bias component B (in the example of FIG. 28 and FIG. 27, $(4n)^2$) of the evaluation value becomes larger, it becomes easier to compare the evaluation value with the threshold value when detecting a watermark.

Figure 20:
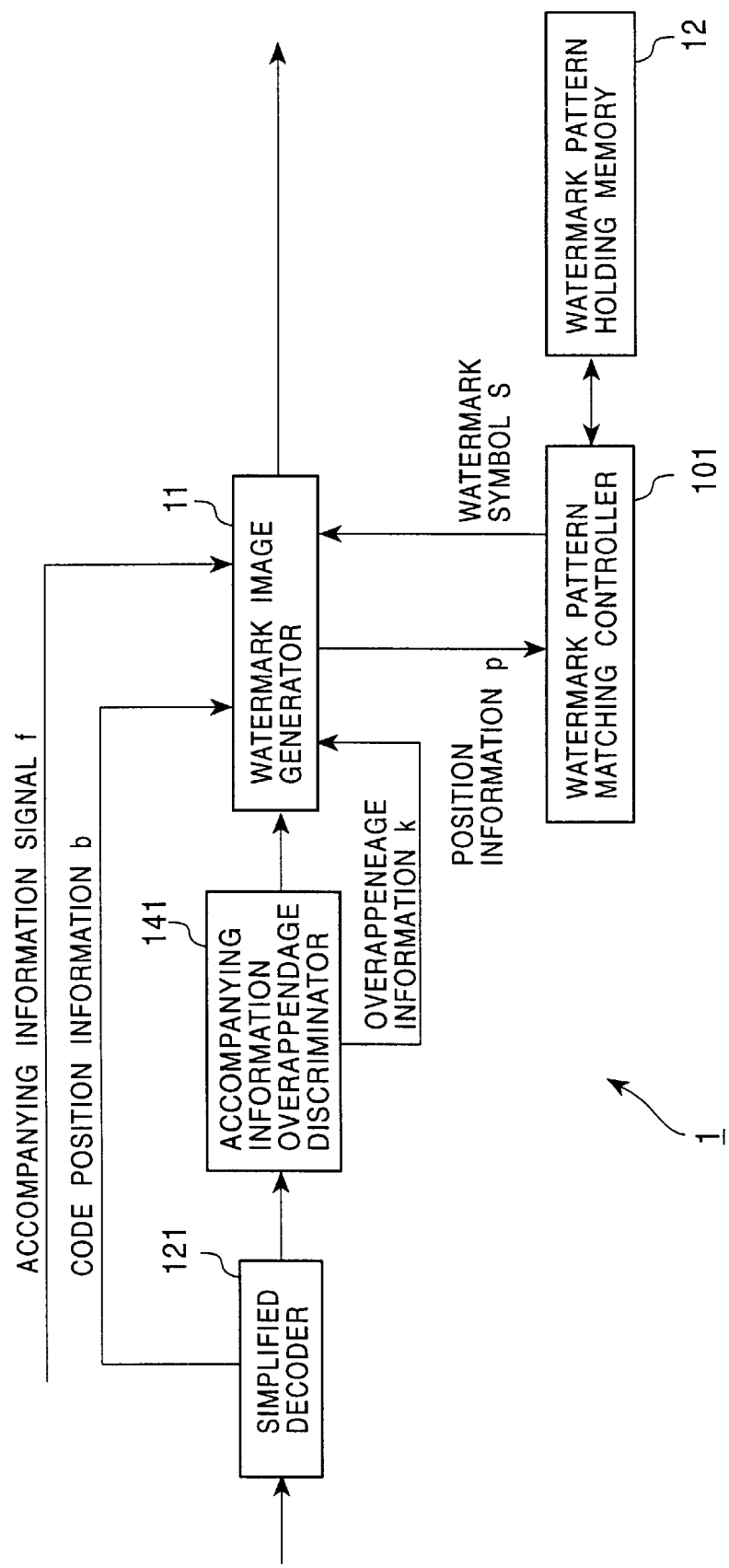
FIG. 20 is a block diagram for showing still another configuration example of the watermarking device 1.

FIG. 20 shows a configuration example of the watermarking device 1 in the case mentioned above. Supplied image data is encoded in a simplified fashion by a simplified encoder 121, then sent to an accompanying information overappendage discriminator 141. The accompanying information overappendage discriminator 141, for example, analyzes the maximum appendage level allowed for appending a watermark pattern, position information thereof, and the like, and supplies the resultant overappendage information k to a watermark image generator 11. Alternatively, the accompanying information overappendage discriminator 141 may obtain the overappendage information k by any other analysis. Other configuration is that shown in FIG. 2 except a watermark is appended in the watermark image generator 11 at an appendage level depending on the overappendage information k.

Figure 21:
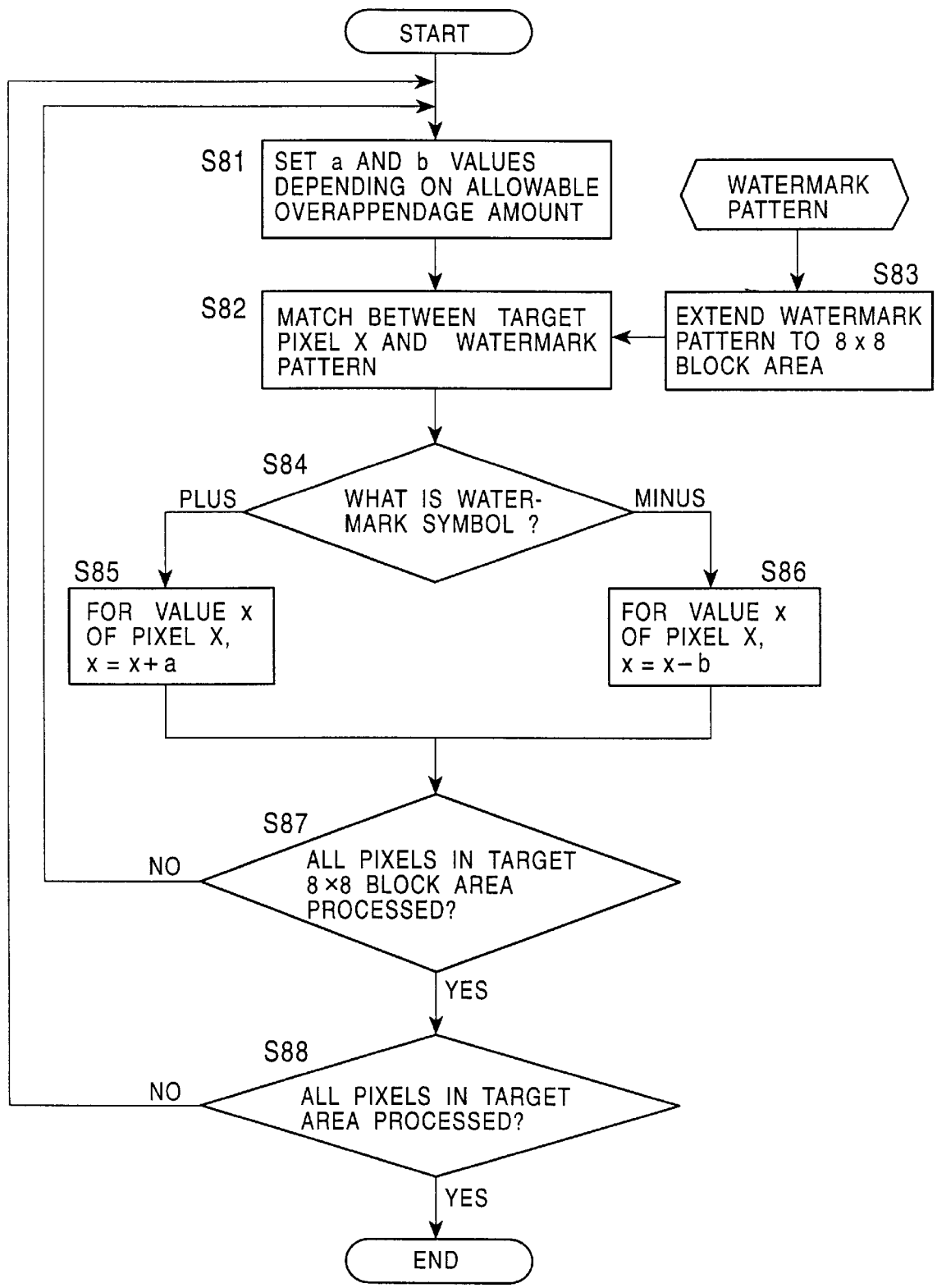
FIG. 21 is a flowchart for explaining an operation of the watermarking device 1 in FIG. 20.

The watermarking device 1 shown in FIG. 20 carries out a series of processing shown in FIG. 21. First, in step S81, the watermarking image generator 11 sets watermarking levels a and b to predetermined values. At this time, the accompanying information overappendage discriminator 141 selects an area on a target image having the same size as the watermark pattern area, calculates the maximum appendage level allowed for appending therein a watermark pattern, and reflects the resultant value to the appendage levels a and b. Alternatively, another method may be used for reflecting the resultant value to the appendage levels a and b. Other processing from step S83 to S88 is similar to the processing from step S2 to S8 shown in FIG. 8, and therefore descriptions thereof are omitted.

Various standards may be used when calculating the maximum appendage level allowed for appending a watermark pattern. Some of examples thereof will be described in the following.

First, the appendage level can be changed using the standard of "within the range where no visual influence is exerted". For example, each of basic appendage levels a0, b0 is set to 1 in advance. In the area where high frequency components are much contained, noise components caused by appending a watermark pattern becomes unobtrusive. Therefore, appendage levels "ak", "bk" are set in advance, and put therein larger values (e.g., 2) than the basic appendage level. Then, a high-pass filter or the like is used to identify the area where high frequency components are much contained in the image targeted for watermarking, and to the above-mentioned area, "ak" and "bk" are appended, and to the remaining area, a0 and b0 are appended. Thereby the watermark appendage amount can be increased within the range not exerting visual influences. Or, it is also possible to set "ak" and "bk" relative to each of areas depending on the levels obtained when a high-pass filter or the like is used, and to carry out appendage processing at the appendage levels.

The aforementioned processing is carried out more easily in the third embodiment. In the third embodiment, a watermark is appended to a DCT DC component which is coded in blocks, for example. As a matter of fact, the DCT DC component has been already obtained at a time when appendage is carried out in actually. Therefore, if the area where high-frequency components are much components is identified using the AC components thereof, for example, the maximum appendage level allowed when appending a watermark pattern can be easily calculated. More specifically, there is a method to increase the level depending on the maximum level thereof when a coefficient other than level 0 is found in the high frequency components such as QF [4][4] to QF [7][7] among quantization levels of DCT coefficient.

The appendage level can also be changed using another standard of "as far as allowed in the fixed length code part at a time of coding". Regarding this, the basic processing method thereof has been mentioned above in connection with the third embodiment. In the third embodiment, the example that a watermark is not appended when the watermark can not be appended using a fixed length code part only was mentioned mainly. Making use of this, it is possible to increase watermark appendage amount within the range that the code length is not changed. For example, here is considered a case where the size of a DC differential component of a luminance signal is 3 and the actual DC differential component zz [0] is −6. If the differential value is replaced from 101001 to 101011 when the symbol of the watermark pattern plus, the actual DC differential component becomes larger than −6 by 2, i.e., −4, and an appendage level b=2 is obtained. If necessary, an appendage level b=13 can be obtained by replacing the differential value from 101001 to 10111 and changing the actual DC differential component from −6 to 7.

Also in the third embodiment, it is similar in the case where a watermark is appended using a motion vector that is coded in macro blocks. Even if the motion vector is shifted more or less, degradation of the quality of the image obtained by decoding is often at most to the extent no visual influence is exerted. Therefore, for example, the motion vector is shifted within the range allowed in the fixed length code part, and a power of the differential image between the predicted image at each shifted position and the actual image is determined in advance. If processing such as replacing with a motion vector having a power less than the threshold value and a large shift amount is carried out when a watermark is appended, the appendage amount of the watermark can be increased.

Other standard than the foregoing may be used for determining the appendage level when appending a watermark pattern. In addition, these standards may be used in combination. As a fifth embodiment, accuracy of detecting a watermark can be increased by dividing and handling a unit area for appendage through an arbitrary method, calculating an estimation value relative to each of the divided sub-areas, and comparing with each of the evaluation values.

Figure 22:
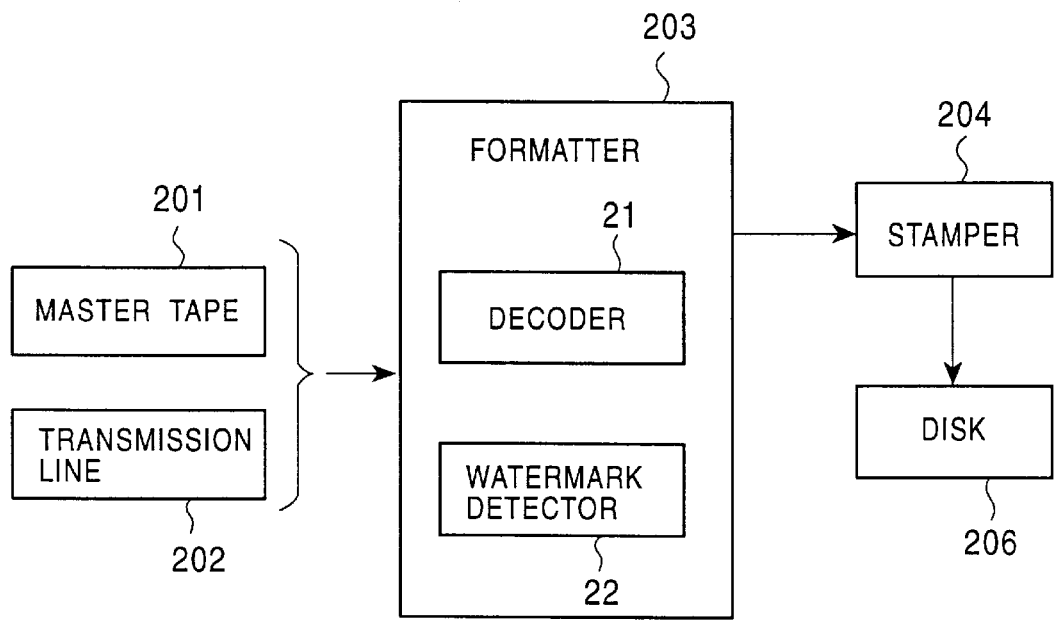
FIG. 22 is a diagram showing a configuration of a formatter to which the present invention is applied.

Although a description has been given taking the case that the present invention is applied to an encoder and a decoder as an example, the present invention can be applied to a formatter as shown in FIG. 22 as well. In this case, image data supplied from a master tape 201 or transmission line 202 is sent to a formatter 203. The formatter 203 contains therein a decoder 21 and a watermark detector 22 both of which have a similar configuration to those mentioned above. The decoder 21 decodes a supplied code bit string and transmits the resultant data to the watermark detector 22. If the image data supplied from the master tape 201 or the transmission line 202 is the image data in a decoded state, such data area directly supplied to the watermark detector 22.

The watermark detector 22 detects whether the supplied image data contains an accompanying information signal f or not, and controls an image converter 34 depending on the result. Accordingly, the image data having a watermark appended thereto is transmitted. A stamper 204 is prepared, and large quantities of replica disks 205 are produced therefrom. On the contrary, if no watermark is appended to the supplied image data, then the image converter 34 does not feeds the image data. Accordingly, in this case, the stamper 204 can not move into production.

Figure 23:
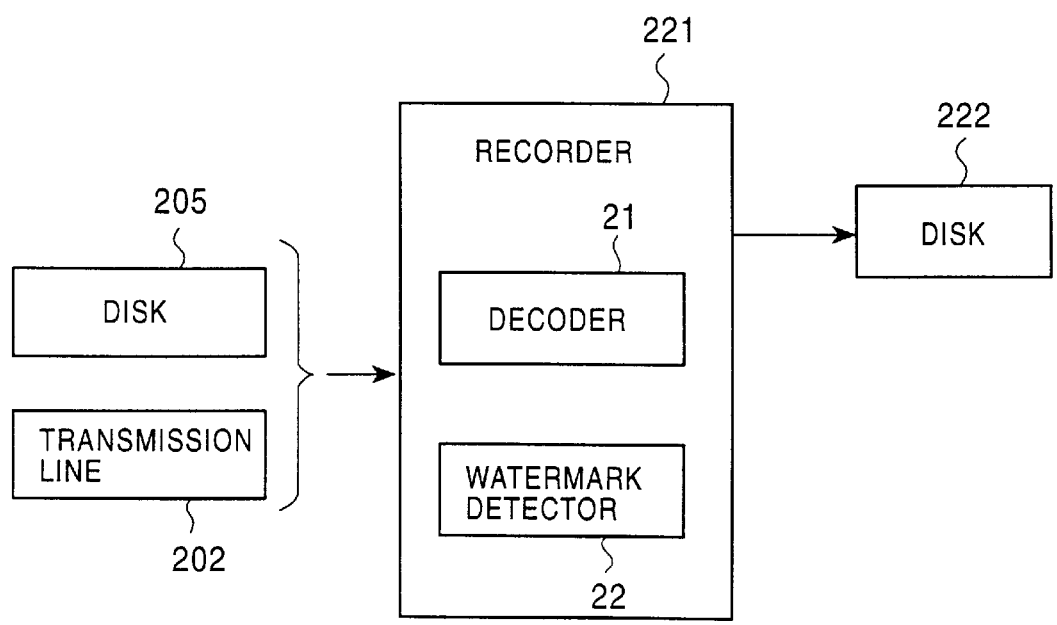
FIG. 23 is a diagram showing a configuration of a recorder to which the present invention is applied.
Figure 24:
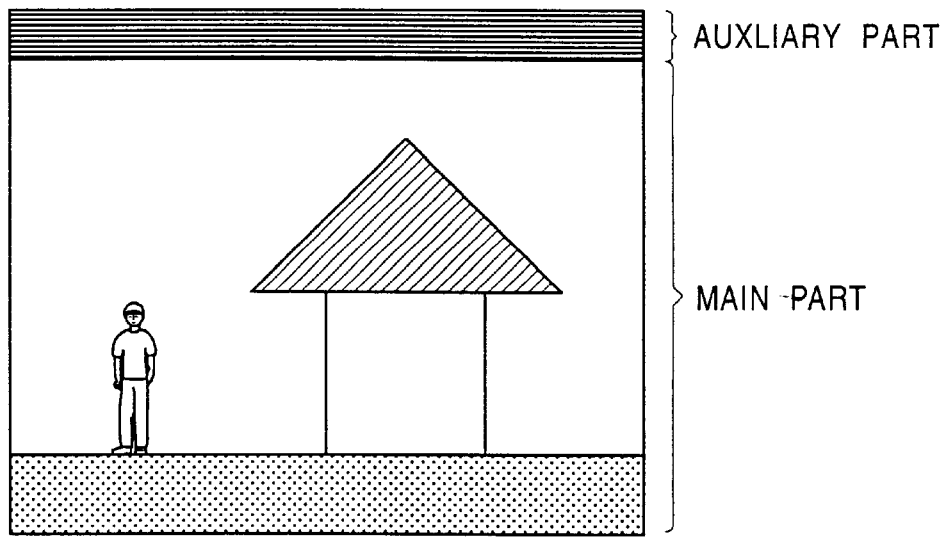
FIG. 24 is a diagram for illustrating an auxiliary information recording position of videotape.
Figure 25:
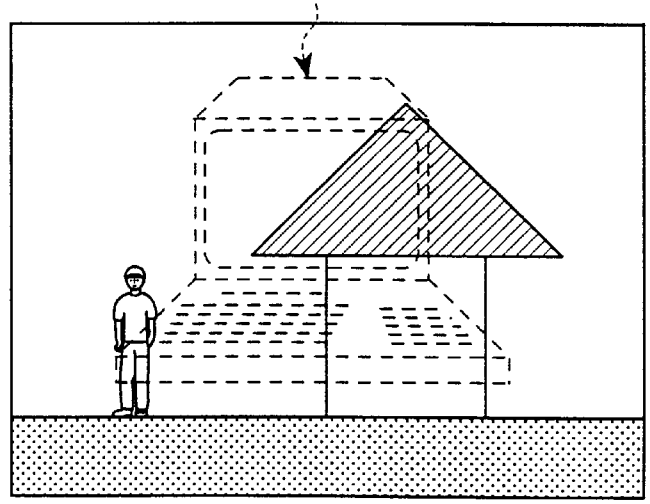
FIG. 25 is a diagram for illustrating a watermark.
Figure 26:
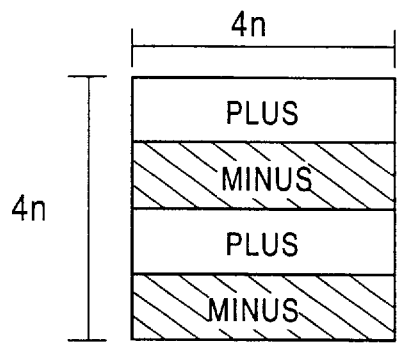
FIG. 26 is a diagram showing an example of a watermark pattern.

FIG. 23 shows a configuration example when the present invention is applied to a recorder. In this case, the recorder 221 is supplied with coded image data or already decoded image data from a disk 205 which is produced by the formatter 203 of FIG. 30 or a transmission line 202. Coded image data is decoded in a decoder 21 and then supplied to a watermark detector 22. The image data in a decoded state is directly supplied to a watermark detector 22.

As is the case of the formatter shown in FIG. 30, when a watermark is appended, the watermark detector 22 allows the image detector 34 to supply the image data for recording in a disk 222, however, when the watermark is not appended, then the watermark detector 22 does not allow the recorder 221 to record the image data thereto. As a transmitting medium for transmitting a program, which implements the aforementioned processing, a communication medium such as a network or a satellite as well as a recording medium such as a magnetic disk, a CD-ROM, and a solid-state memory can be used.

Various modification and variation may be made without departing from the spirit of the present invention.

Accordingly, it should be understood that the scope of the present invention is not limited to the specific embodiments thereof.

Thus, in accordance with a device and method for processing image data, a transmitting medium, and a recording medium of the present invention as in the foregoing, a blocked watermark pattern is appended to coded image data, thereby it becomes possible to easily append a watermark that can be detected certainly.

In addition, since an evaluation value corresponding to a blocked watermark is calculated and then compared with a predetermined reference value, it becomes possible to detect the watermark certainly.

What is claimed is:

1. An image processing device for embedding a watermark into encoded image data, comprising:
    an encoder for encoding input image data into encoded image data; and
    a watermarking device for embedding said watermark into the encoded image data in accordance with an accompanying information signal, said watermarking device comprising:
        a decoder for partially decoding said encoded image data to locate a position within said encoded image data to embed said watermark;
        a watermark image generator for setting a first watermark value and a second watermark value to predetermined values in accordance with said accompanying information signal;
        a watermark pattern matching controller for selecting an area within said encoded image data starting at said position located by said decoder and corresponding to a blocked watermark pattern; and
        said watermark image generator embedding said watermark by modifying each pixel of said encoded image data within the selected area by said first watermark value or said second watermark value on the basis of said blocked watermark pattern.

2. The image processing device according to claim 1, wherein said watermarking device further comprises a watermark pattern holding memory for storing a watermark pattern; and said watermark pattern matching controller enlarges said watermark pattern into said blocked watermark pattern.

3. The image processing device according to claim 2, wherein said blocked watermark pattern has a vertical length that is an integral multiple of a minimum encoded block size.

4. The image processing device according to claim 1, wherein said encoded image data comprises fixed length blocks and said watermark is embedded in said fixed length blocks.

5. The image processing device according to claim 4, wherein said input image data is encoded into said fixed length blocks by a discrete cosine transform, and said watermark is embedded into fixed length blocks corresponding to a direct current component or a motion vector component of the encoded image data.

6. The image processing device according to claim 1, wherein said input image data is encoded using differential pulse code modulation and said watermark image generator compensates for mismatched differential values that occur when embedding said watermark.

7. The image processing device according to claim 1, wherein said watermarking device further comprises an overappendage discriminator for calculating an allowable appendage amount on the basis of said encoded image data; and said watermark image generator sets said first watermark value and said second watermark value to appendage values on the basis of said allowable appendage amount and said accompanying information signal.

8. An image processing method of embedding a watermark into encoded image data, comprising the steps of:
    encoding input image data into encoded image data; and
    embedding said watermark into the encoded image data in accordance with an accompanying information signal by:
        partially decoding said encoded image data to locate a position within said encoded image data to embed said watermark;
        setting a first watermark value and a second watermark value to predetermined values in accordance with said accompanying information signal;
        selecting an area within said encoded image data starting at said position located by said partially decoding step and corresponding to a blocked watermark pattern; and
        embedding said watermark by modifying each pixel within the selected area of said encoded image data by said first watermark value or said second watermark value on the basis of said blocked watermark pattern.

9. The image processing method according to claim 8, wherein said embedding step further comprises retrieving a watermark pattern stored in a watermark pattern holding memory and enlarging said watermark pattern into said blocked watermark pattern.

10. The image processing method according to claim 9, wherein said blocked watermark pattern has a vertical length that is an integral multiple of a minimum encoded block size.

11. The image processing method according to claim 8, wherein said encoded image data comprises fixed length blocks and said watermark is embedded in said fixed length blocks.

12. The image processing method according to claim 11, wherein said input image data is encoded into said fixed length blocks by a discrete cosine transform, and said watermark is embedded into fixed length blocks corresponding to a direct current component or a motion vector component of the encoded image data.

13. The image processing method according to claim 8, wherein said input image data is encoded using differential pulse code modulation and said embedding step compensates for mismatched differential values that occur when embedding said watermark.

14. The image processing method according to claim 8, wherein said embedding step further comprises calculating an allowable appendage amount on the basis of said encoded image data; and said watermark image generator sets said first watermark value and said second watermark value to appendage values on the basis of said allowable appendage amount and said accompanying information signal.

15. A watermark detector for detecting a watermark embedded in encoded image data, comprising:
    a decoder for partially decoding said encoded image data to locate a position within said encoded image data for detecting said watermark;

an estimation value calculator for calculating an estimation value and a threshold value;

a watermark pattern matching controller for selecting an area within said encoded image data starting at said position located by said decoder and corresponding to a blocked watermark pattern; and an estimation value comparator for adjusting said estimation value on the basis of a comparison between each pixel of said encoded image data within the selected area and said blocked watermark pattern; comparing the adjusted estimation value with said threshold value to determine the presence of said watermark; and outputting an accompanying information signal indicating the presence of said watermark; and a code converter for processing said encoded image data to enable decoding of said encoded image data on the basis of said accompanying information signal.

16. The watermark detector according to claim 15, further comprising a watermark pattern holding memory for storing a watermark pattern; and said watermark pattern matching controller enlarges said watermark pattern into said blocked watermark pattern.

17. The watermark detector according to claim 16, wherein said blocked watermark pattern has a vertical length that is an integral multiple of a minimum encoded block size.

18. The watermark detector according to claim 15, wherein said estimation value calculator calculates said estimation value on the basis of the pixel values of said encoded image data within the selected area corresponding to said blocked watermark pattern.

19. A method of detecting a watermark embedded in encoded image data, comprising the steps of:

partially decoding said encoded image data to locate a position within said encoded image data for detecting said watermark;

calculating an estimation value and a threshold value;

selecting an area within said encoded image data starting at said position located in said partially decoding step and corresponding to a blocked watermark pattern; and adjusting said estimation value on the basis of a comparison between each pixel of said encoded image data within the selected area and said blocked watermark pattern; comparing the adjusted estimation value with said threshold value to determine the presence of said watermark; and outputting an accompanying information signal indicating the presence of said watermark; and processing said encoded image data to enable decoding of said encoded image data on the basis of said accompanying information signal.

20. The method according to claim 19, further comprising the steps of retrieving a watermark pattern stored in a watermark pattern holding memory and enlarging said watermark pattern into said blocked watermark pattern.

21. The method according to claim 20, wherein said blocked watermark pattern has a vertical length that is an integral multiple of a minimum encoded block size.

22. The method according to claim 19, wherein said calculating step calculates said estimation value on the basis of the pixel values of said encoded image data within the selected area corresponding to said blocked watermark pattern.

* * * * *